United States Patent
Yabe et al.

(10) Patent No.: US 8,643,219 B2
(45) Date of Patent: Feb. 4, 2014

(54) ELECTRONIC EQUIPMENT AND METHOD FOR CONNECTING ELECTRONIC CIRCUIT SUBSTRATE

(75) Inventors: Masaaki Yabe, Tokyo (JP); Yoshiaki Koizumi, Tokyo (JP); Toshiyasu Higuma, Tokyo (JP); Noriyuki Kushiro, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 602 days.

(21) Appl. No.: 12/989,583

(22) PCT Filed: Mar. 12, 2009

(86) PCT No.: PCT/JP2009/054711
§ 371 (c)(1),
(2), (4) Date: Oct. 25, 2010

(87) PCT Pub. No.: WO2009/142053
PCT Pub. Date: Nov. 26, 2009

(65) Prior Publication Data
US 2011/0043050 A1 Feb. 24, 2011

(30) Foreign Application Priority Data
May 22, 2008 (JP) ................................. 2008-134266

(51) Int. Cl.
*H01F 27/42* (2006.01)
(52) U.S. Cl.
USPC ........................................................ 307/104
(58) Field of Classification Search
USPC ........................................................ 307/104
See application file for complete search history.

(56) References Cited

U.S. PATENT DOCUMENTS

| | | | |
|---|---|---|---|
| 5,329,274 A * | 7/1994 | Donig et al. ................. | 340/5.61 |
| 5,412,253 A | 5/1995 | Hough | |
| 5,909,099 A | 6/1999 | Watanabe et al. | |
| 6,210,771 B1 | 4/2001 | Post et al. | |
| 6,239,879 B1 * | 5/2001 | Hay .............................. | 358/1.15 |
| 6,847,284 B2 | 1/2005 | Gamou et al. | |

(Continued)

FOREIGN PATENT DOCUMENTS

| | | |
|---|---|---|
| JP | 7-066060 A | 3/1995 |
| JP | 8-241386 A | 9/1996 |

(Continued)

OTHER PUBLICATIONS

Office Action dated May 9, 2012, issued in corresponding Chinese Patent Application No. 200980118609.6, and an English Translation thereof. (4 pages).

(Continued)

*Primary Examiner* — Robert L. Deberadinis
(74) *Attorney, Agent, or Firm* — Buchanan Ingersoll & Rooney PC

(57) ABSTRACT

Wireless power supply and information communication are achieved between electronic circuit substrates in the electronic equipment, and the size of the circuitry for achieving the above is reduced. There are provided a first electronic circuit substrate, a second electronic circuit substrate, a first coil connected to the first electronic circuit substrate, and a second coil connected to the second electronic circuit substrate. Power is transmitted from the first coil to the second coil by electromagnetic induction so that the first electronic circuit substrate and the second electronic circuit substrate are electrically connected.

15 Claims, 8 Drawing Sheets

(56) References Cited

U.S. PATENT DOCUMENTS

| | | | |
|---|---|---|---|
| 7,768,790 B2 * | 8/2010 | Kuroda et al. | 361/760 |
| 7,863,859 B2 * | 1/2011 | Soar | 320/108 |
| 2006/0012497 A1 | 1/2006 | Tokuhiro | |

FOREIGN PATENT DOCUMENTS

| | | |
|---|---|---|
| JP | 10-106867 | 4/1998 |
| JP | 11-168268 A | 6/1999 |
| JP | 2000-276562 A | 10/2000 |
| JP | 2001-033136 A | 2/2001 |
| JP | 2002-280230 A | 9/2002 |
| JP | WO 2004/088851 | 10/2004 |
| JP | 2005-260122 A | 9/2005 |
| JP | 2006-340394 A | 12/2006 |
| WO | 2008/050917 A1 | 5/2008 |

OTHER PUBLICATIONS

International Search Report (PCT/ISA/210) issued on Apr. 14, 2009, by Japanese Patent Office as the International Searching Authority for International Application No. PCT/JP2009/054711.

Office Action from Japanese Patent Office issued in corresponding Japanese Patent Application No. 2008-134266 dated on Nov. 16, 2010, with an English translation.

Office Action (Patent Examination Report No. 1) dated Jul. 30, 2012, issued by the Australian Patent Office in corresponding Australian Application No. 2009250645. (3 pages).

* cited by examiner

ELECTRONIC EQUIPMENT AND METHOD FOR CONNECTING ELECTRONIC CIRCUIT SUBSTRATE

TECHNICAL FIELD

The present invention relates to electronic equipment such as consumer electrical appliances and a method for connecting electronic circuit substrate included in electronic equipment.

BACKGROUND ART

In the past, relating to a refrigerator, there has been proposed a technology for solving the problem, "in a conventional structure of a refrigerator having an information display apparatus on a door thereof, the power supply to the door and information communication are achieved in a wired manner. However, the structure requires many components and complicated assembly in the manufacturing process and thus increases the manufacturing cost". According to the technology, "the refrigerator body 1 is provided with a high frequency generating circuit 9 and a power supply circuit 10 comprising a first coil connected therewith, and the door 2 is provided with a power receiving circuit 11 comprising a second coil 5 coupled with the first coil 4 through electromagnetic induction wherein the second coil 5 is connected with an information display 3. The refrigerator body 1 has means for carrying information on the output from the frequency generating circuit 9 and the door 2 has means for detecting the information from a voltage induced in the second coil 5. The door 2 also has means for rectifying the AC voltage induced in the second coil 5 to provide a DC power supply for the information I/O section 3." (Patent Document 1)

Relating to a mobile communication terminal, there has been proposed a technology for providing a mobile communication terminal that can manage both improvement of communication performance of a non-contact coil antenna for IC card interface and a non-contact coil antenna for reader/writer, and down-sizing and thinning of the entire terminal. According to the technology, "a mobile communication terminal 1 such as a cellular phone comprises an upper case 3 internally having an electronic equipment 10, wherein a sheet-shaped flexible substrate 17 having a non-contact coil antenna for IC card interface and a non-contact coil antenna for reader/writer is pasted over the inner surface of the upper case 3 (or inner surface 8a of a cover 8) and a sheet-shaped soft magnetic radio wave absorbent 2 covering the non-contact coil antenna for IC card interface and non-contact coil antenna for reader/writer is pasted over the flexible substrate 17." (Patent Document 2)

Relating to a signal transmission method, there has been proposed a signal transmission method and a signal transmission device capable of easily transmitting a signal with a small number of signal lines. A data signal of time slot count N+α with bit count N is longitudinal-lateral converted into a data signal of time slot count N with bit count N+α, so as to create an empty time α and a control signal is inserted into the empty time+α, thereby converting the parallel signal containing the data signal and the control signal into a serial signal for transmission." (Patent Document 3)

Patent Document 1 Japanese Unexamined Patent Application Publication No. 2001-33136, Abstract Patent Document 2 Japanese Unexamined Patent Application Publication No. 2006-340394, Abstract Patent Document 3 Translation of PCT Application No. 2004/088851, Abstract Disclosure of Invention

PROBLEMS TO BE SOLVED BY THE INVENTION

In general, electronic circuit substrates connected in a wired manner have problems such as decreases in power supply and/or communication quality owing to aged deterioration or the like of the contact parts and the difficulty in reduction of the size and thickness because of the contact parts. Accordingly, electronic circuit substrates connected in a wireless manner has been demanded.

Regarding the point, according to the technology disclosed in Patent Document 1, the power supply and information communication to a door of the refrigerator is implemented by radio waves.

However, the coil structure according to Patent Document 1 has 1 to 3 cm square coils having a thickness of 5 to 10 mm, and further reduction of the size and thickness of the coils is required for the application to smaller electronic equipment, which is a problem.

The technology according to Patent Document 2 allows the reduction in size and thickness of the coil antennas by the integration of a non-contact coil antenna for IC card interface and a non-contact coil antenna for reader/writer.

However, according to the technology disclosed in Patent Document 2, the two kinds of coil antennas are provided on the flexible substrate 17, and the electronic circuit substrates are not connected in a wireless manner.

The technology disclosed in Patent Document 3 easily allows signal transmission with a lower number of signal lines, and the size of the applied electronic equipment can be reduced.

However, though the technology can be easily applied to parallel signals with the signal lines that synchronously change, it has been difficult to transmit parallel signals with the signal lines that asynchronously change or parallel signals with the signal lines that asynchronously change and a serial signal or an analog signal together.

The present invention was made in order to solve the problems, and it is an object of the present invention to allow wireless power supply and information communication between electronic circuit substrates in electronic equipment and reduction of the size of the means of implementation.

MEANS FOR SOLVING THE PROBLEMS

Electronic equipment according to the present invention includes a first electronic circuit substrate, a second electronic circuit substrate, a first coil connected to the first electronic circuit substrate, and a second coil connected to the second electronic circuit substrate. In this case, power is transmitted from the first coil to the second coil by electromagnetic induction so that the first electronic circuit substrate and the second electronic circuit substrate are electrically connected.

ADVANTAGES

With the electronic equipment according to the present invention, power is transmitted from the first coil to the second coil by electromagnetic induction. Thus, the first electronic circuit substrate and the second electronic circuit substrate can be connected in a wireless manner.

No contacts between the first electronic circuit substrate and the second electronic circuit substrate can improve the reliability, the yield strength against aged deterioration and environmental deterioration and ease in handling of the connection part.

The size and thickness of the connection part of the first electronic circuit substrate and the second electronic circuit substrate can be reduced, and the electronic equipment including them can thus have a reduced size.

Figure 1:
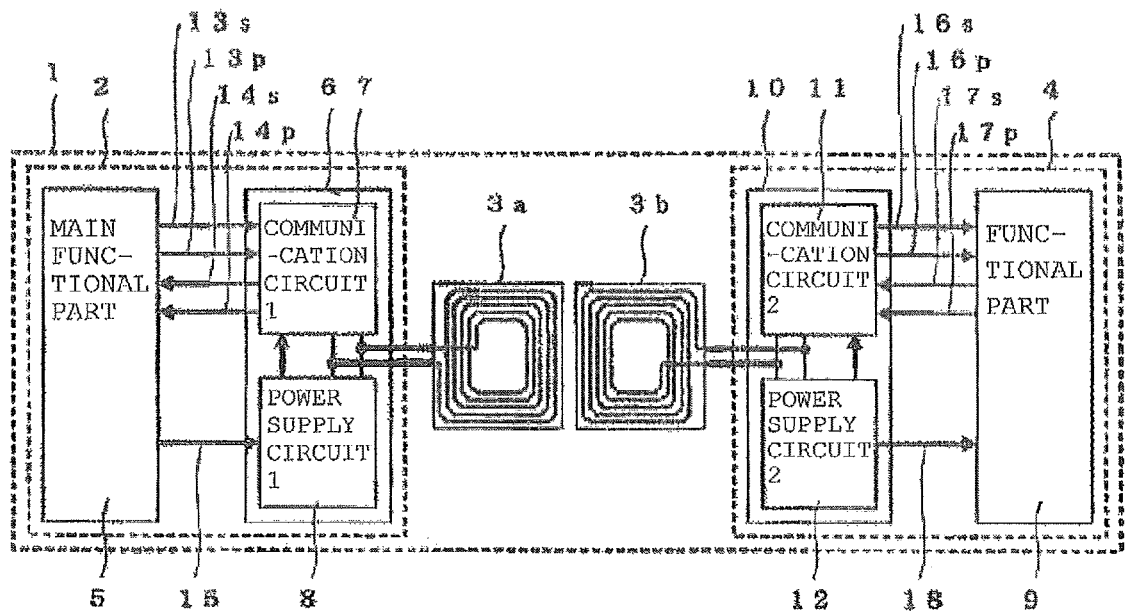
FIG. 1 is a configuration diagram of electronic equipment 1 according to Embodiment 1.

REFERENCE NUMERALS 1 electronic equipment
2 first electronic circuit substrate
3 coil
3a first coil
3b second coil
3Ca first communication coil
3Cb second communication coil
3Pa first power coil
3Pb second power coil
4 second electronic circuit substrate
5 main functional part
6 primary-side noncontact feeding/communication section
7 primary-side communication circuit
7a primary-side modulating circuit
7b primary-side demodulating circuit
7c primary-side signal synthesizing/dividing means
8 primary-side power supply circuit
10 secondary-side noncontact feeding/communication section
11 secondary-side communication circuit
11a secondary-side modulating circuit
11b secondary-side demodulating circuit
11c secondary-side signal synthesizing/dividing means
12 secondary-side power supply circuit
13 main-functional-part output signal line
13s main-functional-part serial signal output line
13p main-functional-part parallel signal output line
14 main-functional-part input signal line
14s main-functional-part serial input signal line
14p main-functional-part parallel input signal line
15 main-functional-part power output
16 auxiliary-functional-part input signal line
16s auxiliary-functional-part serial input signal line
16p auxiliary-functional-part parallel input signal line
17 auxiliary-functional-part output signal line
17s auxiliary-functional-part serial output signal line
17p auxiliary-functional-part parallel output signal line
18 auxiliary-functional-part power supply input
21 flexible substrate
22 circuit pattern
23 coil part
24 connection part
25 connection terminal part
26 through-hole
27 center tap
30 coil gap
31 magnetic substance
32 magnetic shielding material
33 coil connection terminal
34 circuit part
35 coil connection part
36 coil fixing means
40 power supply section
41 primary-side smoothing means
42 AC converting means
43 primary-side resonant capacitor
44 secondary-side resonant capacitor
45 rectifying means
46 secondary-side smoothing means
47 voltage converting means
48 secondary-side voltage output section
50 primary-side communication resonant capacitor
51 primary-side transmit-signal input
52 primary-side carrier-wave generating means
53 primary-side modulating means
54 primary-side current control means
55 primary-side demodulating means
56 primary-side signal amplifying means
57 primary-side buffer means
58 primary-side receive-signal output
59 primary-side power supply
60 secondary-side communication resonant capacitor
61 secondary-side transmit-signal input
62 secondary-side carrier wave generating means
63 secondary-side modulating means
64 secondary-bide current control means
65 secondary-side demodulating means
66 secondary-side signal amplifying means
67 secondary-side buffer means
68 secondary-side receive-signal output 69 secondary-side power supply
71 data synthesizing section
72 data dividing section
73 timer
74 serial data receiving means
75 data encoder section
76 coil transmit-data buffer
77 coil transmitting section
78 coil receiving section
79 coil receive-data buffer
80 serial data transmitting means
81 data decoder section.

BEST MODES FOR CARRYING OUT THE INVENTION

Embodiment 1

FIG. 1 is a configuration diagram of electronic equipment 1 according to Embodiment 1 of the present invention.

In FIG. 1, the electronic equipment 1 includes a plurality of electronic circuit substrates and, in FIG. 1, includes a first electronic circuit substrate 2 and a second electronic circuit substrate 4.

The first electronic circuit substrate 2 is an electronic circuit substrate for implementing a main function of the electronic equipment 1, and the second electronic circuit substrate 4 is an electronic circuit substrate for implementing an auxiliary function of the electronic equipment 1.

A first coil 3a and a second coil 3b are connected to the first electronic circuit substrate 2 and the second electronic circuit substrate 4, respectively. The first coil 3a and second coil 3b will be collectively called coil 3 hereinafter.

The first electronic circuit substrate 2 and second electronic circuit substrate 4 connected in a wired manner and are electrically connected by the electromagnetic induction, coupling between the first coil 3a and the second coil 3b.

Thus, the power supply from the first electronic circuit substrate 2 to the second electronic circuit substrate 4 and the signal transmission and reception between the first electronic circuit substrate 2 and the second electronic circuit substrate 4 are performed through the first coil 3a and second coil 3b with the electromagnetic induction.

The first electronic circuit substrate 2 is an electronic circuit substrate for implementing a main function of the electronic equipment 1 and includes a main functional part 5 and a primary-side noncontact feeding/communication section 6.

The main functional part 5 implements a main function of the electronic equipment 1.

The primary-side noncontact feeding/communication section 6 is connected to the main functional part 5 and first coil 3a and has functions for power supply to the second electronic circuit substrate 4 and transmission and reception of communication signals to and from the second electronic circuit substrate 4.

The main functional part 5 and the primary-side noncontact feeding/communication section 6 are connected via a main-functional-part output signal line 13, a main-functional-part input signal line 14 and a main-functional-part power output 15.

The primary-side noncontact feeding/communication section 6 includes a primary-side communication circuit 7 and a primary-side power supply circuit 8.

The primary-side communication circuit 7 transmits and receives through the first coil 3a and second coil 3b the communication signals that are to be transmitted and received between the main functional part 5 and the auxiliary functional part 9. For that, the primary-side communication circuit 7 performs modulation/demodulation processing on the current in the first coil 3a in accordance with the signals to be transmitted via the main-functional-part output signal line 13 and main-functional-part input signal line 14.

The primary-side power supply circuit 8 performs power supply processing for power supply from the first electronic circuit substrate 2 to the second electronic circuit substrate 4 and controls the current in the first coil 3a.

Examples of the main function output signal line 13 may include a main-function serial output signal line 13s that outputs serial signals and a main-function parallel output signal line 13p that outputs parallel signals.

Examples of the main-function input line 14 include a main-function serial input signal line 14s that inputs serial signals and a main-function parallel input signal line 14p that inputs parallel signals.

The main-function output signal line 13 and main-function input signal line 14 may be analog signal lines instead of digital signal lines for serial signals and parallel signals or the like.

The second electronic circuit substrate 4 is an electronic circuit substrate for implementing an auxiliary function of the electronic equipment 1 and includes an auxiliary functional part 9 and a secondary-side noncontact feeding/communication section 10.

The auxiliary functional part 9 implements an auxiliary function of the electronic equipment 1.

The secondary-side noncontact feeding/communication section 10 is connected to the auxiliary functional part 9 and second coil 3b and has a function of supplying power supplied from the first electronic circuit substrate 2 to the second electronic circuit substrate 4 as the power source and a function for transmission and reception of communication signals to and from the first electronic circuit substrate 2.

The auxiliary functional part 9 and the secondary-side noncontact feeding/communication section 10 are connected via an auxiliary-functional-part input signal line 16, an auxiliary-functional-part output signal line 17 and an auxiliary-functional-part power supply input 18.

The secondary-side noncontact feeding/communication section 10 includes a secondary-side communication circuit 11 and a secondary-side power supply circuit 12.

The secondary-side communication circuit 11 transmits and receives through the first coil 3a and second coil 3b the communication signals to be transmitted and received between the main functional part 5 and the auxiliary functional part 9. For that, the secondary-side communication circuit 11 performs modulation/demodulation processing on the current in the second coil 3b in accordance with the signals to be transmitted via the auxiliary-functional-part input signal line 16 and auxiliary-functional-part output signal line 17.

The secondary-side power supply circuit 12 receives the power fed from the first electronic circuit substrate 2 and supplies the power to the second electronic circuit substrate 4 as the power source.

Here, the auxiliary-function input signal line 16 and auxiliary-function output signal line 17 may be analog signal lines instead of digital signal lines for serial signals and parallel signals.

Figure 2:
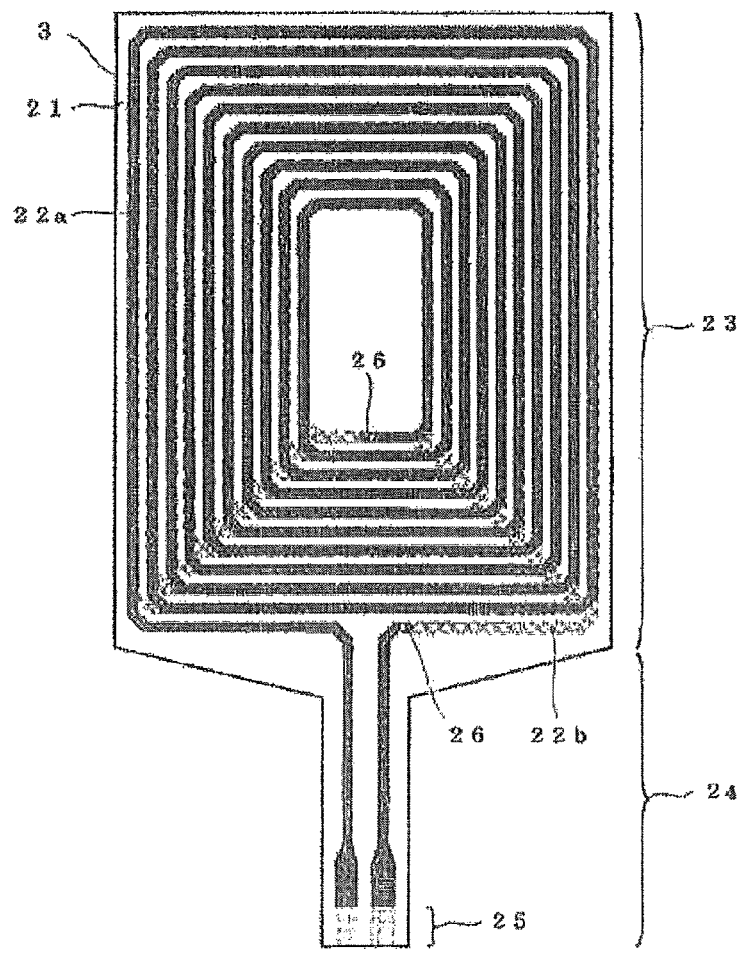
FIG. 2 is a configuration diagram of the coil 3.

FIG. 2 is a configuration diagram of the coil 3. Here, an example of the configuration of a flexible substrate coil by a multilayer substrate of two layers is shown. The coil has 20 turns of 10 turns on the front face of the two layers and 10 turns on the back face.

The coil 3 is a coil having a flexible base material 21 and a flexible substrate composed of a circuit pattern 22 by copper foil or the like fixed on the flexible base material 21. As a whole, the coil 3 includes a coil part 23, a connection part 24 and a connection terminal part 25.

The circuit pattern 22 includes a circuit pattern 22a on the front side and a circuit pattern 22b on the back side. The circuit pattern 22a and the circuit pattern 22b are connected via a through-hole 26.

Figure 3:
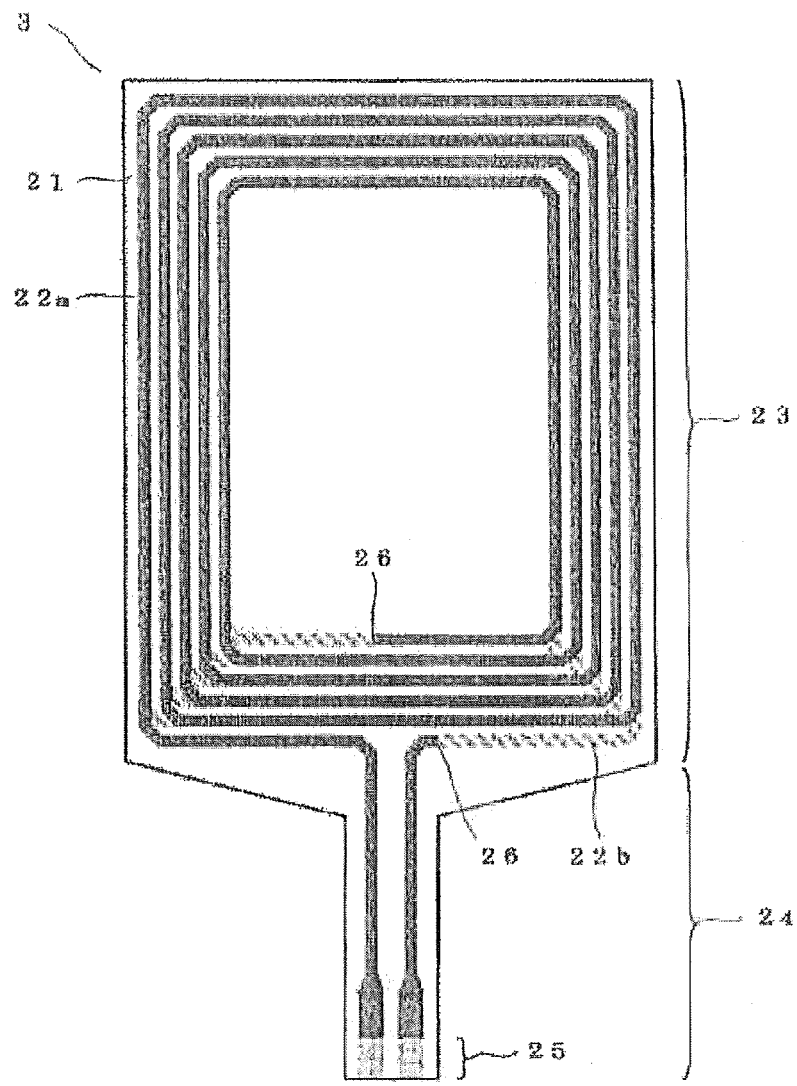
FIG. 3 illustrates another configuration example of the coil 3.

FIG. 3 illustrates another configuration example of the coil 3. FIG. 3 illustrates here the example of the coil having ten turns of five on the front layer of the two layers and five turns on the back layer.

In the flexible substrate coils illustrated in FIG. 2 and FIG. 3, if the numbers of turns of the coils are equal, the inductance of the coil can be increased as the size of the region with no coil patterns at the center of the coil side increases.

As the size of the region with no coil patterns at the center of the coil side increases, the decrease in performance can be minimized against the displacement of the center positions of the faced coils.

As the area where the parts with no coil patterns at the centers of the coil sides of the faced coils overlap with each other increases, the connectivity between the coils increases.

Figure 4:
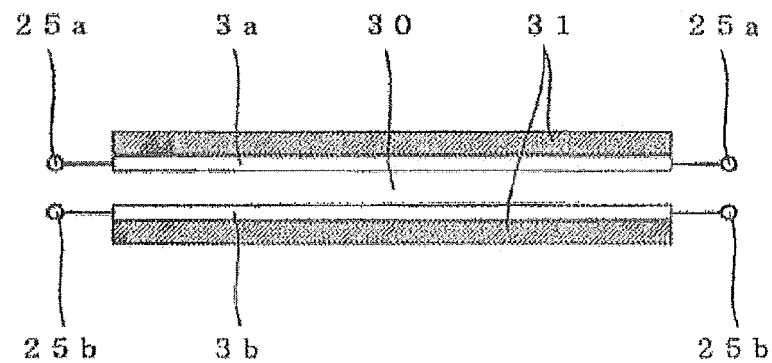
FIG. 4 is a diagram illustrating an example of the arrangement of the first electronic circuit substrate 2 and second electronic circuit substrate 4.

FIG. 4 is a diagram illustrating an example of the arrangement of the first electronic circuit substrate 2 and second electronic circuit substrate 4.

As illustrated in FIG. 4, the first coil 3a and the second coil 3b are arranged so as to face each other. In this case, the coils are arranged with an interval of a gap 30 between coils.

The gap 30 between coils varies in accordance with the attachment conditions of the first electronic circuit substrate 2 and the second electronic circuit substrate 4.

For example, when the first electronic circuit substrate 2 and the second electronic circuit substrate 4 are covered by a resin case or the like, a gap equal to the thickness of the resin case occurs. When such as a resin case is not necessary, the first coil 3a and the second coil 3b are arranged almost in tight contact.

In FIG. 4, the coil 3 is provided between magnetic substances 31. The magnetic substances 31 are attached to the opposite surfaces of the facing surfaces of the first coil 3a and second coil 3b.

Providing the magnetic substances 31 can improve the connectivity between the first coil 3a and the second coil 3b and can minimize the adverse effect of the inhibition of leaks of magnetic fluxes from the coil 3 to neighboring circuits. However, the magnetic substances 31 are not necessary if those measures are not necessary.

The magnetic substances 31 may be plate-like ones containing a material such as iron oxide, chrome oxide, cobalt and ferrite, sheet-like ones containing a mix of the material and a resin or the like.

The sheet-like ones are desirable for effectively using the characteristics of the flexible-substrate coil.

The size of each of the magnetic substances 31 may be larger than that of the coil wiring pattern part extending the outermost circumference of the flexible-substrate coil in order to stimulate the concentration of the magnetic fluxes generated from the coils by the magnetic substances 31 and reduce the leakage flux.

Each of the magnetic substances 31 desirably has a thickness leaving a margin for magnetic flux saturation of the magnetic fluxes generated from the coils. The thickness may be equal to or smaller than 0.5 m in order to take advantage of the thin flexible substrate coil.

Up to this point, there has been described the configuration of the electronic equipment 1 according to Embodiment 1.

Next, the operations by the electronic equipment 1 according to Embodiment 1 will be described by following steps 1 to 11 below.

Step 1: On the first electronic circuit substrate 2, the primary-side power supply circuit 8 in the primary-side noncontact feeding/communication section 6 receives power supply from the connected main functional part 5 and controls the current to feed to the first coil 3a so as to supply power to the second electronic circuit substrate 4.

Step 2: The current fed to the first coil 3a causes the current owing to the electromagnetic induction in the second coil 3b.

Step 3: In the secondary-side power supply circuit 2 in the secondary-side noncontact feeding/communication section 10 on the second electronic circuit substrate 4, the current generated in the second coil 3b is rectified, is converted to DC power and is converted to a predetermined voltage which is then supplied to the second electronic circuit substrate 4 as the power source for the second electronic circuit substrate 4.

Thus, the auxiliary functional part 9 and secondary-side noncontact feeding/communication section 10 on the second electronic circuit substrate 4 operate.

Step 4: In order for the main functional part 5 of the first electronic circuit substrate 2 to transmit information to the auxiliary functional part 9 on the second electronic circuit substrate 4, the primary-side communication circuit 7 in the primary-side noncontact feeding/communication section 6 modulates the transmit information received from the main functional part 5 by handling it as a communication signal and thus controls the current to be fed to the first coil 3a.

Step 5: The current fed to the first coil 3a causes current owing to the electromagnetic induction in the second coil 3b.

Step 6: Since the first coil 3a has the current for power supply here, the current of the communication signal is superposed on the current for power supply.

For the superposition, means using a frequency that is different from the power supply current or means for changing the amplitude of the current for power supply can be used.

Step 7: In the secondary-side communication circuit 11 in the secondary-side noncontact feeding/communication section 10 of the second electronic circuit substrate 4, a communication-signal component is extracted from the current flowing in the second coil 3b to be demodulated and is passed as the receive information from the main functional part 5 on the first electronic circuit substrate 2 to the auxiliary functional part 9.

Step 8: Similarly, in order for the auxiliary functional part 9 on the second electronic circuit substrate 4 to transmit information to the main functional part 5 of the first electronic circuit substrate 2, the secondary-side communication circuit 11 of the secondary-side noncontact feeding/communication section 10 modulates transmission information received from the auxiliary functional part 9 by handling it as a communication signal and thus controls the current to be fed to the second coil 3b.

Step 9: The current fed to the first coil 3b causes a current awing to the electromagnetic induction in the second coil 3a.

Step 10: Since the first coil 3b has the current for power reception here, the current of the communication signal is superposed on the current for power reception.

For the superposition, means using a frequency that is different from the power supply current or means for superposing the communication signal on the change (load modulation) in current occurring in the first coil 3a due to the change in load or resonant frequency on the power receiving side.

Step 11: In the primary-side communication circuit 7 in the primary-side noncontact feeding/communication section 6 of the first electronic circuit substrate 2, a communication signal component is extracted from the current flowing in the first coil 3a, is demodulated and is passed as the received information from the auxiliary functional part 9 on the second electronic circuit substrate 4 to the auxiliary functional part 9.

Up to this point, the operations by the electronic equipment 1 according to Embodiment 1 have been described.

Next, application examples of the configuration in FIG. 1 will be described.

The configuration in FIG. 1 may be used in the following applications a to c:

Application a: In the main functional part 5 in the electronic equipment 1, the auxiliary functional part 9 is isolated from the main functional part 5

Application b: The auxiliary functional part 9 is removed from the main functional part 5

Application c: In addition to the removal, a plurality of auxiliary functions are replaced in accordance with the applications.

The concrete examples of the electronic equipment 1 may include, for example, consumer electrical appliances and wall remote controls (wired) for air handling equipments. A wail remote control for air handling equipment will be described, for example, for describing the specific operations by the electronic equipment 1.

Concrete Example 1

Remote Control for Air Handling Equipment

A remote control for air handling equipment is connected to an indoor unit of the air handling equipment to implement operations by the air handling equipment. The function corresponds to the main functional part 5 of the remote control.

In addition to the function which implements the operations by the air handling equipment, the remote control has an auxiliary function of inputting/outputting the information to be managed by the air handling equipment to external equipment of the remote control. The auxiliary function of inputting/outputting to external equipment of the remote control is assigned to the auxiliary functional part 9 on the second electronic circuit substrate 4.

The auxiliary function of the auxiliary functional part 9 in this remote control example may include a function of connection to a LAN (Local Area Network) or connection to a USB (Universal Serial Bus) device.

In order to allow switching between auxiliary functions in accordance with the requirements, a LAN interface substrate and USE interface substrate may be switchably prepared as the second electronic circuit substrate 4.

The configuration illustrated in FIG. 1 allows the connection between the first electronic circuit substrate 2 (the main function of the remote control for air handling equipment) and the second electronic circuit substrate 4 (the interface functions) without contact connectors and simplifies the replacement between interfaces.

The concrete example of the function of the auxiliary functional part 9 may include a function of writing information such as operation logs and maintenance information on air handling equipment to a USB memory connected to a USB interface provided in the remote control for air handling equipment.

On the other hand, a USB interface has a metallic part such as a contact touchable by a user with the finger, because of its standard terminal form. In this case, the following problems relating to isolation may occur.

Air conditioning equipment is generally connected to an AC power supply of 100 V or 200 V, for example, and the remote control receives the supply of step-down DC voltage as its power source. However, when a breakdown occurs due to an accident in an AC power receiving section, there is a possibility that the AC power supply may be directly applied to the remote control.

In this case, when the AC power supply voltage owing to the breakdown is directly applied to a human-touchable terminal, there is a risk that the human being who touches the terminal may get an electric shock, for example.

Accordingly, the configuration of the electronic equipment 1 according to Embodiment 1 may be applied in order to isolate between the electronic circuit substrate of the remote control and the electronic circuit substrate of the interface.

In the configuration in FIG. 1, the electronic circuit substrate of the remote control and the electronic circuit substrate of the interface are not connected in a wired manner but are electrically connected by using the effect of electromagnetic induction. Thus, advantageously, they are isolated from each other, and there may be no rinks that a human being who touches the terminal gets an electric shock, for example.

Up to this point, there has been described the example applying the configuration in FIG. 1 to the configuration relating to a remote control for air handling equipment.

Next, there will be described an example applying the configuration in FIG. 1 to a control substrate for an outdoor unit of air handling equipment.

Concrete Example 2

Control Substrate for Outdoor Unit of Air Handling Equipment

Though, in the configuration in FIG. 1, the first electronic circuit substrate 2 and the second electronic circuit substrate 4 are internally provided in the electronic equipment 1, the second electronic circuit substrate 4 is not typically required to be internally provided in the electronic equipment 1.

It is assumed that the first electronic circuit substrate is a control substrate for an outdoor unit of air handling equipment and the second electronic circuit substrate 4 is a circuit substrate for maintenance of the air handling equipment.

A circuit substrate for maintenance is a movable device to be carried by a maintenance practitioner. The maintenance of air handling equipment requires connection of a maintenance circuit to a contact terminal provided on the substrate of the outdoor-unit.

However, the outdoor unit of air handling equipment is placed outdoors and is susceptible to temperature changes, direct sunlight, the weather and so on. There is a high possibility that the contact terminal may be affected by the environment and be deteriorated.

The application of the electronic equipment 1 according to Embodiment 1 can eliminate the necessity for electrically wired connection between the control substrate of the outdoor unit of the air handling equipment and the circuit substrate for maintenance. Thus, even when the contact terminal is deteriorated, the electrical connection is hardly affected. This can improve the tolerance against environmental deterioration of the control substrate of the outdoor unit.

In this way, according to Embodiment 1, since the first electronic circuit substrate 2 and the second electronic circuit substrate 4 are electrically connected by electromagnetic induction, the first electronic circuit substrate 2 and the second electronic circuit substrate 4 can be connected in a wireless manner.

This can isolate between the first electronic circuit substrate 2 and the second electronic circuit substrate 4.

According to Embodiment 1, no contact between the first electronic circuit substrate 2 and the second electronic circuit substrate 4 can improve the reliability and the tolerance against aged deterioration and environmental deterioration of the connection part.

Embodiment 1 allows reduction of the size and thickness of the connection part between the first electronic circuit substrate 2 and the second electronic circuit substrate 4 and reduction of the size of the electronic equipment including the configuration.

Embodiment 1 further can improve the ease in handling the connection part between the first electronic circuit substrate 2 and the second electronic circuit substrate 4 and allows easy removal of the first electronic circuit substrate 2 and the second electronic circuit substrate 4.

According to Embodiment 1, the coil 3 connected to the first electronic circuit substrate 2 and the second electronic circuit substrate 4 is configured by a flexible substrate, the size and thickness of the coil 3 can be reduced, and the size of the electronic equipment 1 using the coil 3 can be reduced.

Since a flexible substrate is thin and is thus bendable, the degree of freedom of the position where the coil is to be arranged can be improved, and the handling can be easier.

Hence, compared with a case where a transformer is used for power supply or as a communication-signal isolating device, a reduced volume and a reduced cost may be required for the connection. Compared with a case where a photocoupler is used, the transmission speed can be improved.

The reduced thickness of the coil 3 and the magnetic substances on the facing side between the first coil 3a and the second coil 3b and the opposite side can improve the inhibition of the influence of leakage of magnetic fluxes to neighboring circuits and the connectivity between the first coil 3a and the second coil 3b can be improved.

Embodiment 2

According to Embodiment 1, the coil 3 is shared by communication and power transmission/reception. Thus, according to Embodiment 1, the coil 3 to be connected to the first electronic circuit substrate 2 is the first coil 3a only, and the coil 3 to be connected to the second electronic circuit substrate 4 is the second coil 3b only.

According to Embodiment 2 of the present invention, there will be described an example in which the coil 3 is configured separately for power transmission/reception and for communication.

When a small amount of power is supplied from the first electronic circuit substrate 2 to the second electronic circuit substrate 4 and the transmission speed is low between the first electronic circuit substrate 2 and the second electronic circuit substrate 4 and when the supply capability is 100 m W or below and the transmission speed is 2.4 kbps, carrier waves for power supply may be used to perform communication.

In this case, as described according to Embodiment 1, a coil can be shared between the communication and the power supply.

However, the request for further increase in transmission speed and the request for increase in amount of power to be fed are conflicting because increasing the frequency of carrier waves is required for the increase in transmission speed while increasing the carrier wave frequency in accordance with the transmission speed reduces the power supply performance from the power-supply viewpoint.

Thus, it is difficult to meet both of the requests with one same coil.

Accordingly, according to Embodiment 2, in order to increase both of the transmission speed and the amount of power supply, the coil 3 is divided into a communication coil and a power coil. It is assumed here that the transmission speed is 240 kbps or higher and the supply capability is one W or higher.

Figure 5:
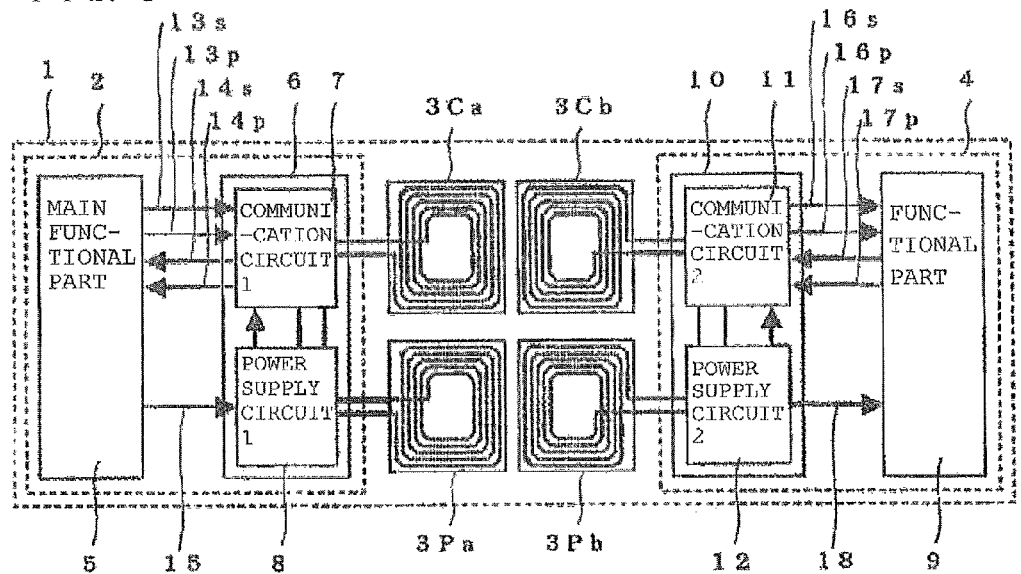
FIG. 5 is a configuration diagram of electronic equipment 1 according to Embodiment.

FIG. 5 is a configuration diagram of electronic equipment 1 according to Embodiment 2 of the present invention. Like numerals refer to like parts to those in FIG. 1 according to Embodiment 1, and the description will be omitted.

In FIG. 5, on a first electronic circuit substrate 2, a first communication coil 3Ca is connected to a primary-side communication circuit 7 in the primary-side noncontact feeding/communication section 6, and a first power coil 3Pa is connected to a primary-side power supply circuit 8.

Similarly, on a second electronic circuit substrate 4, a second communication coil 3Cb is connected to a secondary-side communication circuit 11 in a secondary-side noncontact feeding/communication section 10, and a second power coil 3Pb is connected to a secondary-side power supply circuit 12.

Among the coils, the first communication coil 3Ca and the second communication coil 3Cb face each other, and the first power coil 3Pa and the second power coil 3Pb face each other.

Each of the coils 3 is a coil having a flexible substrate and includes a flexible substrate 21 and a circuit pattern 22 by copper foil or the like fixed on the flexible substrate 21, as illustrated in FIG. 2 or FIG. 3 of Embodiment 1.

The specifications such as the number of turns of the coils may not be the same between the communication coils 3Ca and 3Cb and the power coils 3Pa and 3Pb, but the coils may have different specifications in order to acquire their performances. The facing first coil and second coil may not be coils with identical specifications but may have different specifications such as the numbers of turns.

Figure 6:
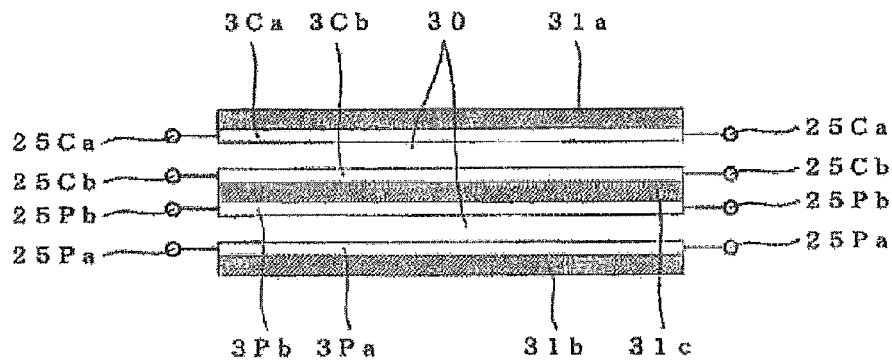
FIG. 6 illustrates an example of the arrangement of the first communication coil 3Ca and the second communication coil 3Cb and the first power coil 3Pa and the second power coil 3Pb.

FIG. 6 illustrates an example of the arrangement of the first communication coil 3Ca and the second communication coil 3Cb and the first power coil 3Pa and the second power coil 3Pb.

FIG. 6 illustrates a connection terminal 25Ca of the first communication coil 3Ca, a connection terminal 25Cb of the second communication coil 3Cb, a connection terminal 25Pa of the first power coil 3Pa, and a connection terminal 25Pb of the second power coil 3Pb.

In FIG. 6, the first communication coil 3Ca and the second communication coil 3Cb face each other, and the first power coil 3Pa and the second power coil 3Pb face each other. The opposite surfaces of the facing surfaces of the coils have a magnetic substance 31.

The upper magnetic substance 31a and lower magnetic substance 31b are provided across the entire coils, and the middle magnetic substance 31c separates between the communication coils and the power coils.

A gap 30 is provided between the first coil and the second coil in the communication coils and the power coils.

The middle magnetic substance 31c has one of the communication coils (which is the second communication coil 3Cb in FIG. 6) on one side and one of the power coils (which is the second power coil 3Pb in FIG. 6) on the other side.

The middle magnetic substance 31c is provided through the gaps 30 between the upper first communication coil 3Ca and the lower first power coil 3Pa. The upper magnetic substance 31a is provided on the external side of the first communication coil 3Ca and the lower magnetic substance 31b is provided below the first power coil 3Pa.

In this way, the coils are placed over one another in the parallel with the plane direction of the flexible-substrate coils.

Figure 7:
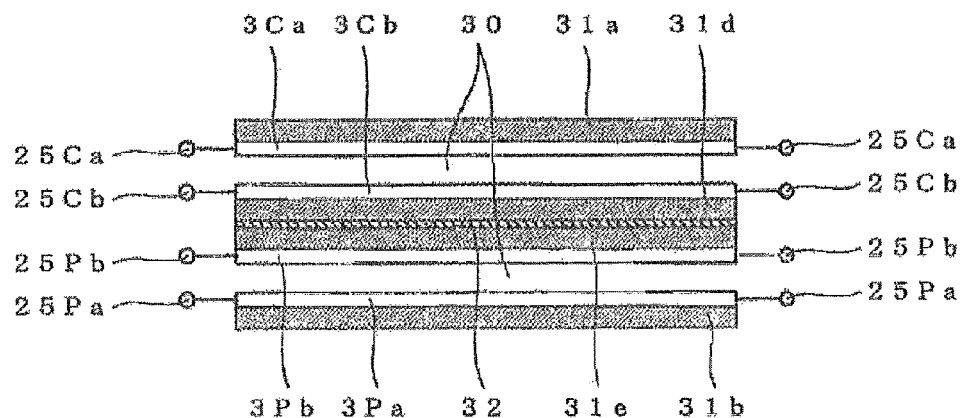
FIG. 7 illustrates another arrangement example of the first communication coil 3Ca and the second communication coil 3Cb and the first power coil 3Pa and the second power coil 3Pb.

FIG. 7 illustrates another arrangement example of the first communication coil 3Ca and the second communication coil 3Cb and the first power coil 3Pa and the second power coil 3Pb.

In the configuration in FIG. 6, under some use conditions such as the frequency and current value, the communication coils 3Ca and 3Cb and the power coils 3Pa and 3Pb may have mutual interference, and their performance may be reduced thereby. In those cases, the configuration illustrated in FIG. 7 can minimize the interference.

In FIG. 6, the communication coils 3Ca and 3Cb and the power coils 3Pa and 3Pb are separated by the middle magnetic substance 31c, which however may cause interference.

Accordingly, as in FIG. 7, the middle magnetic substance 31c is divided into a middle magnetic substance 31d and a middle magnetic substance 31e, and a magnetic shielding material 32 is provided therebetween. Thus, this can block the magnetic fluxes between the communication coils 3Ca and 3Cb and the power coils 3Pa and 3Pb and minimize the mutual interference.

The magnetic shielding material 32 may be an aluminum sheet or plate.

Aluminum is a non-magnetic substance in a DC magnetic field and does not have influence on the magnetic flux output by a coil but is a diamagnetic material in an AC magnetic field and generates a magnetic flux in the direction that the magnetic flux generated by a coil is cancelled.

This effect allows the magnetic flux to be transmitted to the opposite surface of the magnetic shielding material 32 and can minimize the interference between the coils.

Figure 8:
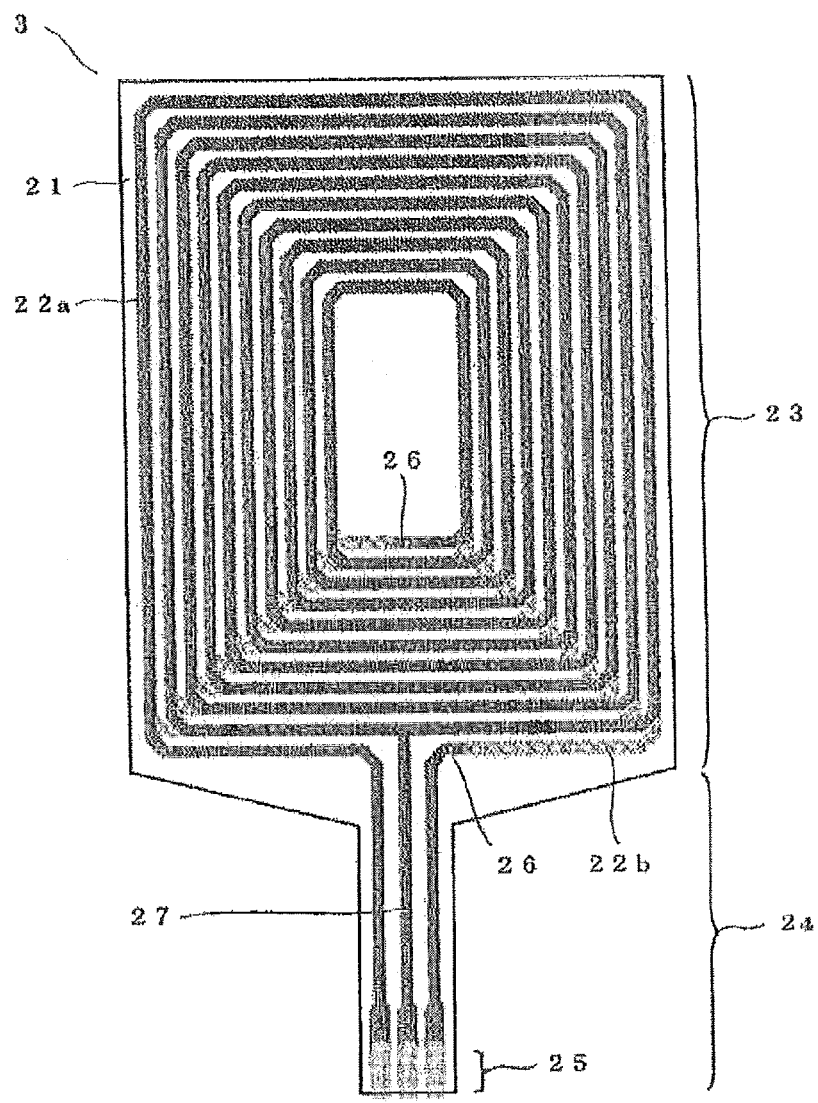
FIG. 8 illustrates a configuration example for separating the coils 3 into communication coils and power coils.

FIG. 8 illustrates a configuration example for separating the coils 3 into communication coils and power coils. Like numerals refer like parts to those in FIG. 2 or FIG. 3, and the description will be omitted.

While FIG. 5 to FIG. 7 illustrate the configuration example in which the coils are divided into communication coils and power coils, the coils as illustrated in FIG. 8 may be used according to a method for dividing coils into communication coils and power coils.

The coils illustrated in FIG. 8 are coils having flexible substrates like those in FIG. 2 or FIG. 3, but a center tap 27 is used to divide one winding into a plurality of windings so that one coil can be used as a plurality of coils.

FIG. 8 illustrates an example in which the center tap 27 is provided in the coil illustrated in FIG. 2 so as to configure two coils with different numbers of turns. One with a lower number of turns is used as a communication coil, and one with a higher number of turns is used as a power coil.

The coil illustrated in FIG. 8 can configure the communication coil and the power coil one flexible substrate. This can eliminate the necessity for placing communication coils and power coils one over another unlike those in FIG. 6 or FIG. 7. The similar configuration to that is FIG. 4 may be acquired in which the first coil and the second coil are faced to each other and the magnetic substances are arranged on the facing surfaces and the opposite surfaces.

However, the effect that minimizes the mutual interference may be lower than that of the method that separates between the communication coils and the power coils.

As described above, since, according to Embodiment 2, the first electronic circuit substrate 2 and the second electronic circuit substrate 4 are electrically connected by electromagnetic induction, the similar effect to that of Embodiment 1 can be exerted.

Since the coils 3 connected to the first electronic circuit substrate 2 and second electronic circuit substrate 4 have flexible substrates, the similar effect to that of Embodiment 1 can be exerted.

Since even when the coils 3 are divided into communication coils and power coils as in Embodiment 2, the use of the flexible-substrate coils can reduce the thickness of the coils, the increase in volume occupied by the coils can be minimized.

Thus, the size of the electronic equipment having the coils can also be reduced.

According to Embodiment 2, the use of the flexible-substrate coils allows the placement of the coils one over another and mutually close arrangement of the coils even when the coils are divided into communication coils and power coils.

This can minimize the increase in coil volume and can provide the equal ease in handling to the case where one coil is used as in the configuration sharing one coil.

As described with reference to FIG. 8, the use of the center tap 27 in a coil allows the division of one coil into a plurality of sections to be used as a communication coil and a power coil. This can provide equal ease in handling to that of one coil.

Compared with the case using a plurality of coils, the positioning of facing coils can be implemented with only one coil, and the reliability of the coil performance can be increased.

As described with reference to FIG. 6, when a plurality of first coils and second coils divided into communication coils and power coils are placed one over another and are faced each other, a magnetic substance is provided on the facing surfaces and the opposite surfaces of the coils having different applications. This can increase the coupling between the coils.

Sharing the middle magnetic substance 31c that separates coils allows the reduction of the number of magnetic substances and thus can reduce the size of the electronic equipment having the coils and the costs.

As described with reference to FIG. 7, when a plurality of first coils and second coils divided into communication coils and power coils are placed one over another and are faced each other state, the magnetic shielding material 32 is arranged between the coils for different applications. This can minimize the mutual interference caused between the coils.

Thus, the equal ease in handling to the case sharing a coil can be provided.

Embodiment 3

According to Embodiment 3 of the present invention, the characteristics of a flexible-substrate coil are used to placing a plurality of coils one over another and connecting them in series so as to adjust the number of turns of the coil winding (or the inductance value of the coil).

Since the configuration excluding a coil 3 illustrated in FIG. 9 as will be described later is similar to those in Embodiment 1 or 2, the description will be omitted.

The reasons for the necessity of the adjustment of the number of turns of a coil winding will be described first, and the configuration of a coil 3 according to Embodiment 3 will then be described.

The use of the coil 3 as a power coil requires the transmission of a larger amount of power than that of a communication coil and thus requires a larger amount of current to be fed to the coil than that of a communication coil.

For a communication application, the amount of power to be supplied by electromagnetic induction between a first coil and a second coil may be the order of several mW. However, a power application may require the supply of several hundreds mW to several W or higher power in order to operate the second electronic circuit substrate 4.

Thus, a power coil application requires transmission of power 100 to 1000 times of the power on a communication coil.

In order to transmit a large amount of power, the number of turns of a power coil winding as a coil specification must be larger than the number of turns of a communication coil winding. The ratio of the number of turns of a communication coil and a power coil must be four or more for communication use while it is one for power use.

The communication between coils with electromagnetic induction may require current at a high frequency according to the transmission speeds to be fed to the communication coils.

For example, when a transmission speed of 240 kbps (bit/s) is required, the frequency of carrier waves to be used for communication may be 2.4 MHz that is approximately 10 times of the transmission speed. In order to acquire a transmission speed of 240 Mbps, the frequency of carrier waves to be used for communication may be 2.4 GHz.

On the other hand, the frequency of current to be fed to a power coil must be lower than that for a communication coil. Since the use of a frequency in the order of MHz for the transmission of power may require an element that can operate at a high frequency and can receive a large amount of current, the cost for the electronic circuit is increased, the high frequency causes a loss owing to the capacity coupling in the circuit, and an advanced circuit design is required. As a result, the handling of the circuit becomes complicated.

Therefore, the current to be fed to the power coil must be at a lower frequency than that to a communication, and a higher inductance of the coil is required for increasing the effect of the electromagnetic induction. In other words, the number of turns of the coil winding must be increased.

It is assumed here that the carrier wave frequency for generating coil current to be used for communication is a frequency in the order of MHz or higher and the carrier wave frequency for generating coil current for power is 10 kHz to 500 kHz.

Up to this point, the reasons for adjusting the number of turns of a coil winding have been described.

Next, the configuration of the coil 3 according to Embodiment 3 will be described.

Coils having flexible substrates can only have the equal number of coil patterns to the number of layers of a multilayer substrate because of the configuration.

For that reason, the coils have lower inductance than the coils wound about bobbins with an equal size if the numbers of turns are equal, and the coil performance is thus lower. However, the thickness is lower than wound coils.

By using this, a plurality of flexible-substrate coils may be serially connected and be placed one over another as in FIG. 9 as will be described later so as to adjust the number of turns of the coils (or the inductance value of the coils).

Since the flexible-substrate coils placed one over another do not rapidly increase the thickness of the coils, the magnetic substances may be placed on the facing surfaces of the coils and the opposite surfaces like the case having one coil.

Figure 9:
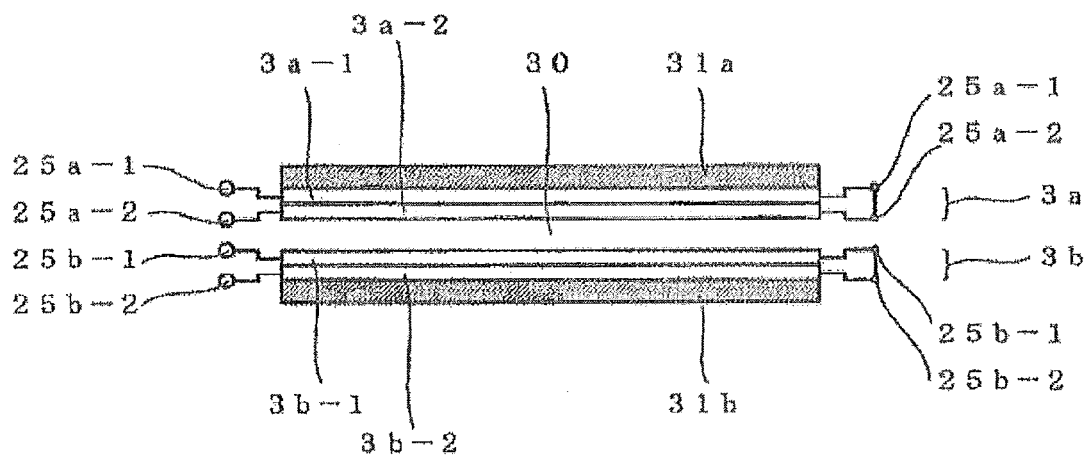
FIG. 9 illustrates a coil configuration of electronic equipment 1 according to Embodiment 3.

FIG. 9 illustrates a coil configuration of electronic equipment 1 according to Embodiment 3.

In FIG. 9, a first coil 3*a* includes two coils 3*a*-1 and 3*a*-2, and connection terminals 25*a*-1 and 25*a*-2 provided to the coils of the first coil 3*a* are connected such that the coils can be connected in series.

Similarly, a second coil 3*b* includes two coils 3*b*-1 and 3*b*-2, and connection terminals 25*b*-1 and 25*b*-2 provided to the coils of the second coil 3*b* are connected such that the coils can be connected in series.

If the coil 3*a*-1 and coil 3*a*-2 have the same specifications, the first coil 3*a* may have the twice number of turns as the coil 3*a*-1. The coil 3*a*-1 and the coil 3*a*-2 may have different specifications.

Similarly, the second coil 3*b* may have the combination of the coil 3*b*-1 and coil 3*b*-2 that is changeable according to the requested specifications.

FIG. 9 illustrates an example in which the number of turns of the coil winding is changed by changing the number of serially connected coils in accordance with the use condition with the flexible-substrate coils. This is particularly effective in the configuration in which the first coil 3*a* and second coil 3*b* are divided into communication coils 3Ca and 3Cb and power coils 3Pa and 3Pb.

Comparing between a communication coil and a power coil, a larger amount of power is transmitted through the power coil than the communication coil, the coil winding requires a higher number of turns (or increased inductance of the coil).

Since only using coils having one type of specification can reduce the cost for one coil more than making a plurality of coils having different specifications, the communication coils and the power coils having the same specifications may be used, and the required number of turns of the coil winding (or inductance value of the coil) of the power coils can be provided by increasing the number of serial connections between the power coils.

According to the method, several coils having fundamental specifications may only be required to implement various coil specifications by changing the number of serial connections.

Since a coil having a flexible substrate is 50 μm thick or below, a plurality of coils placed one over another can be thinner than the thickness of an electronic circuit substrate.

Through the communication coil, bidirectional communication is performed between the first electronic circuit substrate 2 and the second electronic circuit substrate 4. For that, the circuit configurations are preferably symmetrical. Through the power coil on the other hand, power is fed only in one direction from the first electronic circuit substrate 2 to the second electronic circuit substrate 4. Thus, the first power coil 3Pa and the second power coil may not have the same specifications (including the numbers of turns of the wiring).

If the first power coil 3Pa and the second power coil 3Pb have the same numbers of turns when power is transmitted by electromagnetic induction from the first power coil 3Pa to the second power coil 3Pb, the voltage generated in the second power coil 3Pb tends to decrease due to coupling loss or copper loss between the coils.

In this case, the number of turns of the second power coil 3Pb may be higher than that of the first power coil 3Pa.

As described above, according to Embodiment 3, the first coil 3*a* and the second coil 3*b* are configured by a flexible-substrate coil, and the coil may be configured to be a coil with various specifications by changing the number of serial connections in accordance with the use conditions.

Therefore, the serially connected coils may be stacked, and magnetic substances may be arranged on the opposite face of the facing surface of the piled coils like the case of a single sheet of the coil.

As a result, coils with various specifications can be easily configured, and the size and thickness of the coils can be reduced.

According to Embodiment 3, since the coil specifications can be changed easily in accordance with the number of serial connections, a fewer types of coils may be used to configure coils having an arbitrary number of turns. Thus, the number of types of coil can be reduced.

As a result, the cost required for producing coils can be reduced, and the increase in cost for the electronic equipment using them can be minimized.

According to Embodiment 3, since the communication coils and the power coils are separately configured, it is also easy to differentiate between the carrier wave frequency for communication and the carrier wave frequency for power by 100 times or more, for example.

As a result, it is easy to use the carrier wave frequencies suitable for the applications of communication and power transmission.

Embodiment 4

According to Embodiment 3 of the present invention, the characteristics of a flexible-substrate coil are used to placing a plurality of coils one over another and connecting them in series so as to adjust the cross section (current capacity).

Since the configuration excluding a coil 3 illustrated in FIG. 10 as will be described later is similar to those in Embodiment 1 or 2, the description will be omitted.

In a coil configured by a flexible substrate, the thickness of the copper foil of a coil pattern is limited because of the configuration and may be approximately 35 μm at a maximum, for example.

When a circuit is configured by multilayer flexible substrates, the equal number of parallel circuits to the number of configurations can be configured. However, since parallel patterns are configured on the same layer as that of the coil winding, one coil can have a reduced number of turns of the coil, compared with the case not using parallel patterns, if the area of the coil is fixed.

Figure 10:
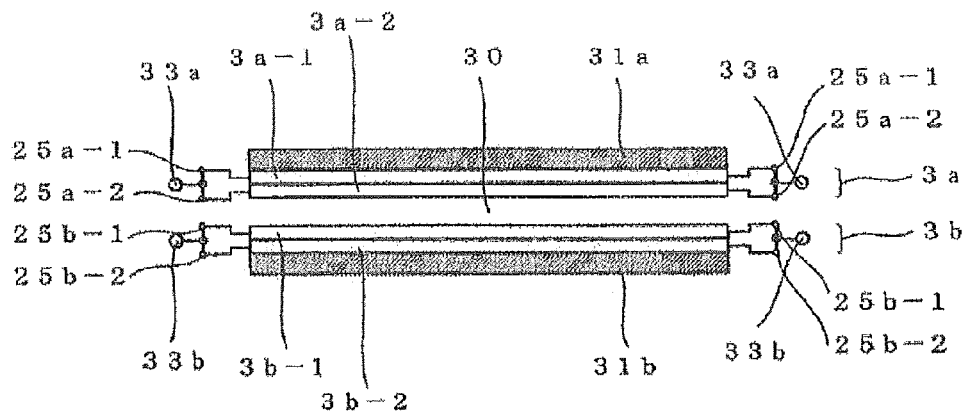
FIG. 10 illustrates a coil configuration of electronic equipment 1 according to Embodiment 4.

FIG. 10 illustrates a coil configuration of electronic equipment 1 according to Embodiment 4.

In FIG. 10, a first coil 3a includes two coils 3a-1 and 3a-2, and connection terminals 25a-1 and 25a-2 provided to the coils of the first coil 3a are connected such that the coils can be connected in parallel.

Similarly, a second coil 3b includes two coils 3b-1 and 3b-2, and connection terminal 25b-1 and 25b-2 provided to the coils of the second coil 3b are connected such that the coils can be connected in series.

If the coil 3a-1 and the coil 3a-2 are the same coils, the first coil 3a may have a coil pattern having a double cross-section with the equal number of turns as that of the coil 3a-1.

The second coil 3b may also be configured similarly to the first coil 3a-1 and the coil 3a-2.

In FIG. 10, the connection terminals of the parallel coils are aggregated to a first coil connection terminal 33a and a second coil connection terminal 33b.

FIG. 10 illustrates an example in which the cross section (current capacity) of the coil winding is changed by changing the number of parallel connections of coils in accordance with the use condition with the flexible-substrate coils. This is particularly effective in the configuration in which the first coil 3a and second coil 3b are divided into communication coils 3Ca and 3Cb and power coils 3Pa and 3Pb.

The power coil requires a higher number of turns of coil winding, and a larger amount of current must be fed thereto, compared with the communication coil.

The communication coil and the power coil may be configured in different sizes but may require different coil specifications. Furthermore, in arranging the coils internally in the electronic equipment 1, the difference in size between the communication coil and the power coil may affect on the positions to arrange and/or arranging means therefor. Thus, the communication coil and the power coil preferably have an equal size.

Accordingly, equal coil specifications, particularly one coil size may be adopted to configure the communication coil and the power coil having an equal size. In order to acquire the current capacity required for the power coil, the coils are connected in parallel.

In order to increase the number of turns of the coil winding, the coils may be connected in series as in Embodiment 3.

A combination of the serial connection of flexible-substrate coils according to Embodiment 3 and the parallel connection of flexible-substrate coils according to Embodiment 4 can change the number of turns (or inductance) of the coil winding and/or the cross-section (or current capacity) of the coil winding.

There will be described an example in which Embodiment 3 and Embodiment 4 are combined to produce one coil by using both of the serial connection and parallel connection, below.

Four coils having the same specifications are used, and two pairs of the serially connected two coils are configured and are connected in parallel. Thus, compared with basic one coil, the number of turns of the coil winding becomes double, and the cross-section (or current capacity) of the coil winding becomes double.

The four coils may be placed one over another, and a magnetic substance 31 may be placed one surface of each of the coils like the one in FIG. 4 so that the first or second coil can be configured.

Since only using coils having one type of specification can reduce the cost for one coil more than making a plurality of coils having different specifications, the communication coils and the power coils having the same specifications may be used, and the required cross section (or current capacity) of the coil winding of the power coils can be provided by increasing the number of parallel connections between the power coils.

As a result, several coils having fundamental specifications may only be required to implement various coil specifications by changing the number of parallel connections.

As described above, according to Embodiment 4, the first coil 3a and second coil 3b are configured by flexible-substrate coils, and the coils may be configured to be coils with different current capacities by changing the number of parallel connections in accordance with the use conditions.

Therefore, the coils connected in parallel may be placed one over another, and magnetic substances may be arranged on the opposite surfaces of the facing surfaces of the piled coils like cases with one coil.

As a result, coils with various specifications can be easily configured, and the size and thickness of the coils can be reduced.

According to Embodiment 4, since the coil specifications can be changed easily in accordance with the number of parallel connections, a fewer types of coils may be used to configure coils having an arbitrary current capacity. Thus, the number of types of coil can be reduced.

As a result, the cost required for producing coils can be reduced, and the increase in cost for the electronic equipment using them can be minimized.

Embodiment 5

Figure 11:
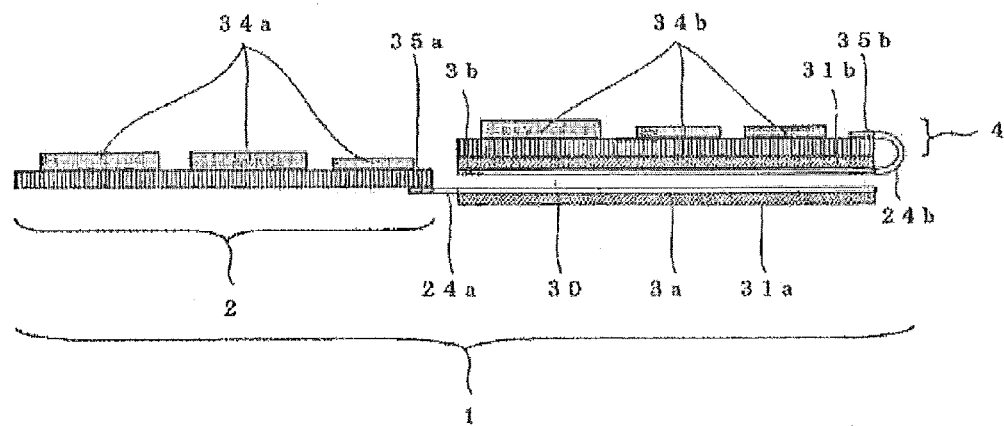
FIG. 11 is a configuration diagram of electronic equipment 1 according to Embodiment 5.

FIG. 11 is a configuration diagram of electronic equipment 1 according to Embodiment 5 of the present invention. FIG. 11 illustrates an example of the arrangement of a first electronic circuit substrate 2, a second electronic circuit substrate 4, a first coil 3a and a second coil 3b inside of the electronic equipment 1.

The electronic equipment 1 includes the first electronic circuit substrate 2 and the second electronic circuit substrate 4.

The first electronic circuit substrate 2 is a circuit that implements a main function of the electronic equipment 1 and includes a primary-side circuit part 34a, a primary-side coil connection part 35a, a first coil 3a connected to the primary-side coil connection part 35a, and a magnetic substance 31a arranged on one surface of the first coil 3a.

The second electronic circuit substrate 4 is a circuit that implements an auxiliary function of the electronic equipment 1 and includes a secondary-side circuit part 34b, a secondary-side coil connection part 35b, a second coil 3b connected to the secondary-side coil connection part 35b, and a magnetic substance 31b arranged on one surface of the second coil 3b.

In order to minimize the influence of malfunction owing to magnetic fluxes generated by the coils to the electronic circuit substrates and prevent the decrease in power supply performance and communication performance owing to metal near the coils, a magnetic shield may be provided on the opposite surface of the surface having the magnetic substance 31 of the coils.

In the second electronic circuit substrate 4, the magnetic substance 31b is fixed to the surface not having the secondary-side circuit part 34b, and the second coil 3b is fixed to the opposite surface of the magnetic substance 31b of the electronic circuit substrate.

Since the second coil 3b is configured by a flexible substrate, the connection terminal part 24b of the second coil 3b may be bent to fix to the secondary-side circuit part 34b of the second electronic circuit substrate 4.

Since the first coil 3a connected to the first electronic circuit substrate 2 is also configured by a flexible substrate, the first coil 3a may be arranged in a narrow space such as between the bottom surface of the second electronic circuit substrate 4 and the case (not shown) of the electronic equipment 1.

Having illustrated in FIG. 11 the example in which the second coil 3b is fixed to the second electronic circuit substrate 4, the first coil 3a may be fixed to the first electronic circuit substrate 2.

Since the components excluding those according to Embodiment 5 are the same as those according to one of Embodiments 1 to 4, the description has been omitted.

As described above, Embodiment 5 can reduce the space required for connecting the first electronic circuit substrate 2 and the second electronic circuit substrate 4. Thus, the size and thickness of the electronic equipment 1 and the costs can be reduced.

Fixing one coil to an electronic circuit substrate can facilitate the arrangement and fixing of the first electronic circuit substrate 2 and the second electronic circuit substrate 4, which improves the ease in handling.

Embodiment 6

Figure 12:
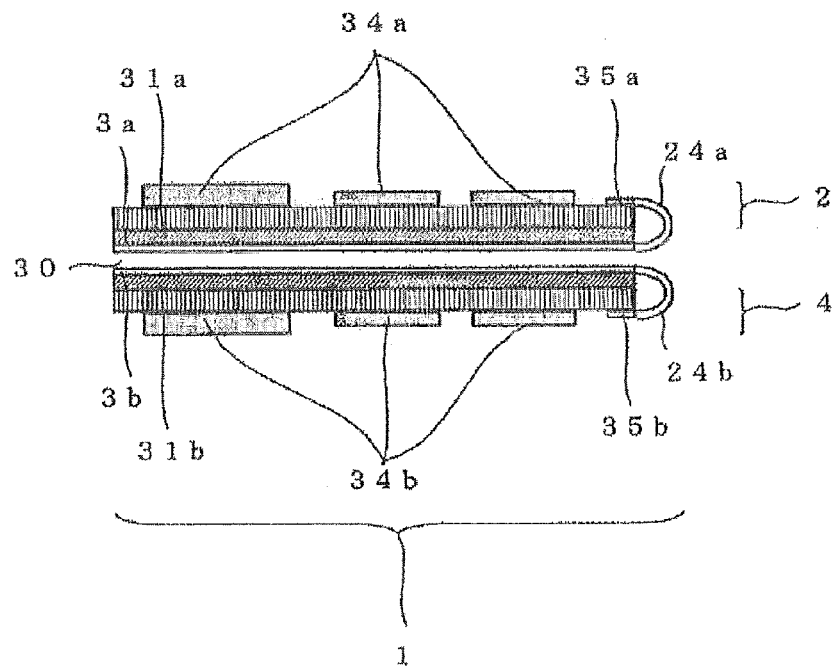
FIG. 12 is a configuration diagram of electronic equipment 1 according to Embodiment 6.

FIG. 12 is a configuration diagram of electronic equipment 1 according to Embodiment 6 of the present invention. Since the components in FIG. 12 are identical to those in FIG. 11 excluding the arrangement method, like numbers refer to like parts, and the description will be omitted.

In the first electronic circuit substrate 2, the magnetic substance 31a is fixed to the surface not having the primary-side circuit part 34a, and the first coil 3a is fixed to the opposite surface of the magnetic substance 31a of the electronic circuit substrate.

Since the first coil 3a is configured by a flexible substrate, a connection terminal part 24a of the first coil 3a may be bent to fix to the opposite surface of the surface having the primary-side circuit part 34a of the first electronic circuit substrate 2.

Similarly, in the second electronic circuit substrate 4, the magnetic substance 31b is fixed to the surface not having the secondary-side circuit part 34b, and the second coil 3b is fixed to the opposite surface of the magnetic substance 31b of the electronic circuit substrate.

Since the second coil 3b is configured by a flexible substrate, the connection terminal part 24b of the second coil 3b may be bent to fix to the secondary-side circuit part 34b of the second electronic circuit substrate 4.

The first electronic circuit substrate 2 and second electronic circuit substrate 4 configured as described above are arranged such that the coils can face each other. The first electronic circuit substrate 2 and second electronic circuit substrate 4 are fixed with a case (not shown), for example, of the electronic equipment 1.

In this way, Embodiment 6 can exert the similar effects to those of Embodiment 5.

Embodiment 7

Figure 13:
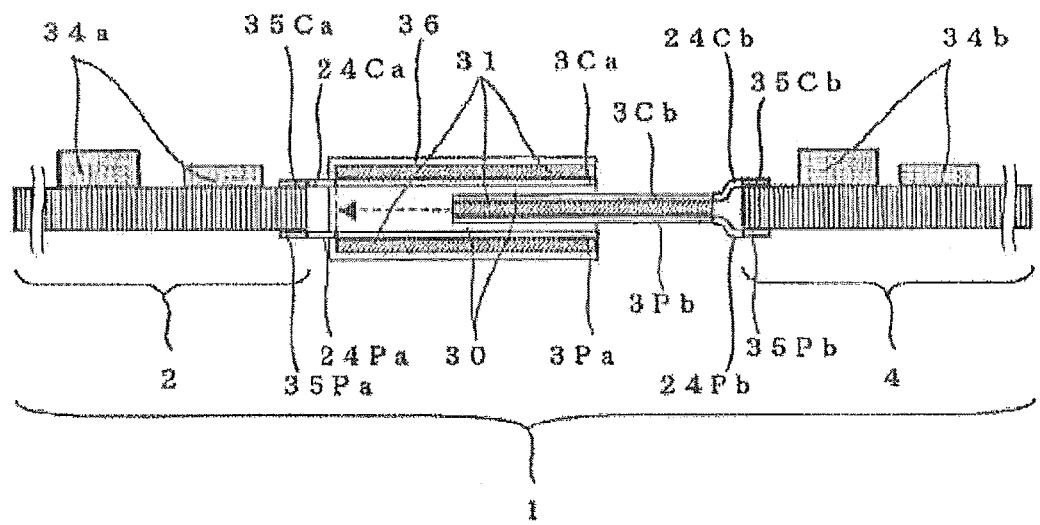
FIG. 13 is a configuration diagram of electronic equipment 1 according to Embodiment 7.

FIG. 13 is a configuration diagram of electronic equipment 1 according to Embodiment 7 of the present invention. FIG. 13 illustrates an example of the arrangement of a first electronic circuit substrate 2, a second electronic circuit substrate 4, a first communication coil 3Ca, a first power coil 3Pa, a second communication coil 3Cb and a second power coil 3Pb internally in the electronic equipment 1.

The electronic equipment 1 includes the first electronic circuit substrate 2 and the second electronic circuit substrate 4.

The first electronic circuit substrate 2 is a circuit that implements a main function of the electronic equipment 1 and includes a primary-side circuit part 34a, a primary-side communication coil connection part 35Ca, a first communication coil 3Ca connected to the primary-side communication coil connection part 35Ca, a magnetic substance 31 arranged on one surface of the first communication coil 3Ca, a primary-side power coil connection part 35Pa, a first power coil 3Pa connected to the primary-side power coil connection part 35Pa, a magnetic substance 31 arranged on one surface of the first power coil 3Pa, coil fixing means 36 for fixing the first communication coil 3Ca and first power coil 3Pa and the magnetic substances provided to the coils.

The second electronic circuit substrate 4 is a circuit that implements an auxiliary function of the electronic equipment 1 and includes a secondary-side circuit part 34b, a secondary-side communication coil connection part 35Cb, a second communication coil 3Cb connected to the secondary-side communication coil connection part 35Cb, a magnetic substance 31 arranged on one surface of the second communication coil 3Cb, a secondary-side power coil connection part 35Pb, and a second power coil 3Pb connected to the secondary-side power coil connection part 35Pb.

The second communication coil 3Cb and the second power coil 3Pb are arranged on different surfaces of the magnetic substance 31.

The configuration of the second communication coil 3Cb, second power coil 3Pb and magnetic substance 31 in FIG. 13 are similar to the configuration illustrated in FIG. 6 according to Embodiment 2 or the configuration illustrated in FIG. 7.

Since details of the configuration are similar to those of Embodiment 2, the description will be omitted.

The first communication coil 3Ca and the first power coil 3Pa are fixed inside the coil fixing means 36 in such a way to interpose the magnetic substances 31 with the coils 3 and the coil fixing means 36.

Thus, the first communication coil 3Ca and the first power coil 3Pa are fixed to the coil fixing means 36 in an opposing condition.

In this case, a gap is formed between the first communication coil 3Ca and the first power coil 3Pa, and where a coil connected to the second electronic circuit substrate 4 is inserted, which is constituted by the second communication coil 3Cb and the second power coil 3Pb and the magnetic substance 31 interposed by the above two coils.

In this case, the first communication coil 3Ca and the second communication coil 3Cb are arranged to face each other, and the first power coil 3Pa and the second power coil 3Pb are arranged to face each other.

Coil gaps 30 are formed between the first communication coil 3Ca and the second communication coil 3Cb and between the first power coil 3Pa and the second power coil 3Pb. The coil fixing means 36 may have a spring mechanism, for example, that applies pressure to the first communication coil 3Ca and the first power coil 3Pa such that the internally inserted second communication coil 3Cb and second power coil 3Pb can be held in tight contact. This can improve the coupling between the coils more.

Having described with reference to FIG. 13 the means having the coil fixing means 36 for the coils to be connected to the first electronic circuit substrate 2 side, the second coil, instead of the first coil, may have the fixing means 36.

In order to minimize the influence of malfunction owing to magnetic fluxes generated by the coils to the electronic circuit substrates and prevent the decrease in power supply performance and communication performance owing to metal near the coils, a magnetic shield may be provided on the opposite surface of the surface having the magnetic substance 31 of the coils.

Since the components excluding those according to Embodiment 7 are the same as those according to one of Embodiments 2 to 4, the description has been omitted.

In this way, Embodiment 7 can facilitate the connection between the first electronic circuit substrate 2 and the second electronic circuit substrate 4.

Since the coils are configured by flexible substrates, the space required for fixing the coils can be reduced. Thus, the size and thickness of the electronic equipment 1 and the costs can be reduced.

Holding and fixing one coil with the other coil can felicitate the arrangement and fixing of the first electronic circuit substrate 2 and second electronic circuit substrate 4, which improves the ease in handling.

Embodiment 8

Up to this point, the peripheral configurations of the first electronic circuit substrate 2 and second electronic circuit substrate 4 have been mainly described according to Embodiments 1 to 7. According to Embodiment 8 of the present invention, there will be described specific operation examples relating to communication and/or power transmission/reception between the substrates.

While an example in which the communication coil and the power coil are provided separately as in Embodiment 2 will, be described in the following description, the basic operations are the same even when a coil shared for communication and power is used.

Figure 14:
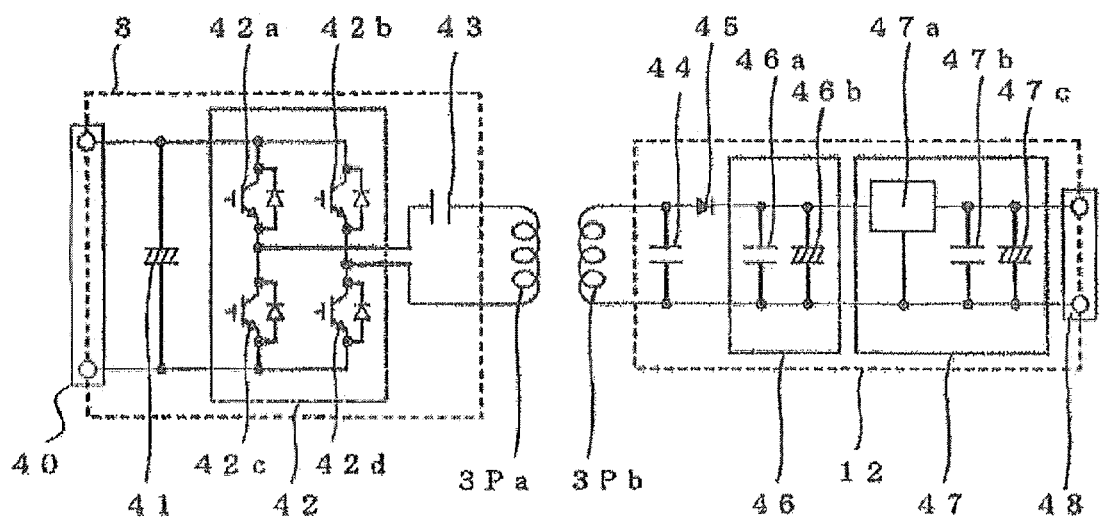
FIG. 14 illustrates a configuration example including a primary-side power supply circuit 8 and a secondary-side power supply circuit 12 according to Embodiment 8.

FIG. 14 illustrates a configuration example including a primary-side power supply circuit 8 in a primary-side noncontact feeding/communication section 6 and a secondary-side power supply circuit 12 in a secondary-side noncontact feeding/communication section 10 according to Embodiment 8.

In FIG. 14, the primary-side power supply circuit 8 includes a power supply section 40, a primary-side smoothing means 41, an AC converting means 42, a primary-side resonant capacitor 43.

The secondary-side power supply circuit 12 includes a secondary-side resonant capacitor 44, a rectifying means 45, a secondary-side smoothing means 46, a voltage converting means 47, and a secondary-side voltage output section 48.

The power supply section 40 indicates the supply point of power to be supplied from a main functional part 5 of the first electronic circuit substrate 2.

The primary-side smoothing means 41 is configured by an electrolytic capacitor.

The AC converting means 42 includes bridge switching elements such as a transistor, a MOSFET and an IGBT and a switching-element control means 42e that performs ON/OFF control over the switching elements. FIG. 14 illustrates switching elements 42a, 42b, 42c and 42d.

The illustrated AC converting means 42 has a full-bridge circuit configuration, but it may be half-bridge circuit configuration. The switching elements 42a to 42d are subject to ON/OFF control by a switching-element control means 42e (not shown).

The rectifying means 45 may be configured by a diode, for example. Though FIG. 9 illustrates a method using a half-wave rectifier circuit, a method using a full-wave rectifier circuit may be used.

The secondary-side smoothing means 46 is configured by a capacitor 46a or an electrolytic capacitor 46b.

The voltage converting means 47 includes a regulator 47a, a capacitor 47b and an electrolytic capacitor 47c.

Next, with reference to FIG. 14, the operation for power supply from the first electronic circuit substrate 2 to the second electronic circuit substrate 4 will be described by following steps 1 to 5.

Step 1: In the primary-side power supply circuit 8 within the primary-side noncontact feeding/communication section 6 in the first electronic circuit substrate 2, the DC power supplied from the power supply section 40 is converted to AC power by the AC converting means 42, and the main functional part 5 supplies the AC power to a first power coil 3Pa.

Step 2: Here, the AC converting means 42 outputs a frequency that resonates the first power coil 3Pa and primary-side resonant capacitor 43 and a second power coil 3Pb and secondary-side resonant capacitor 44.

Step 3: When the first power coil 3Pa and the second power coil 3Pb face each other, the power supplied from the AC converting means 42 to the first power coil 3Pa is induced to the second power coil 3Pb by electromagnetic induction coupling.

Step 4: Here, in a secondary-side power supply circuit 8 in a secondary-side noncontact feeding/communication section 10, the AC power acquired by the second power coil 3P is rectified by the rectifying means 45 and is smoothed by the secondary-side smoothing means 46 for conversion to DC power.

Step 5: The DC power acquired here is converted by the voltage converting means 47 to voltage required for driving the second electronic circuit substrate 4.

Though FIG. 14 illustrates the configuration in which the first power coil 3Pa and the primary-side resonant capacitor 43 are serially connected, they may be connected in parallel in accordance with the circuit configuration to be applied. Similarly, FIG. 14 illustrates the configuration in which the second power coil 3Pb and the secondary-side resonant capacitor 44 are connected in parallel, they may be serially connected in accordance with the circuit configuration to be applied.

Up to this point, there has been described the operation for power supply from the first electronic circuit substrate 2 to the second electronic circuit substrate 4.

Figure 15:
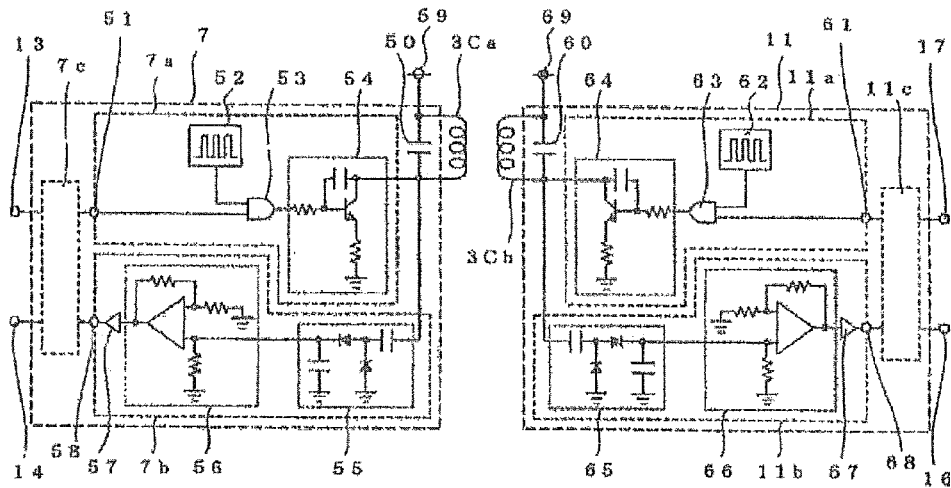
FIG. 15 illustrates a configuration example of a primary-side communication circuit 7 and a secondary-side communication circuit 11 according to Embodiment 8.

FIG. 15 illustrates a configuration example of a primary-side communication circuit 7 within a primary-side noncontact feeding/communication section 6 and a secondary-side communication circuit 11 within the secondary-side noncontact feeding/communication section 10 according to Embodiment 8.

In FIG. 15, the primary-side communication circuit 7 includes a primary-side modulating circuit 7a, a primary-side demodulating circuit 7b, a primary-side signal synthesizing/dividing means 7c, and a primary-side communication resonant capacitor 50.

The primary-side communication circuit 7 is connected to the first communication coil 3Ca and main functional part 5. The transmit signal output by the main functional part 5 is input via a main-function signal output line 13 to the primary-side communication circuit 7, and the receive signal input to the main functional part 5 is output via a main-function signal input line 14.

The primary-side modulating circuit 7a includes a primary-side carrier-wave generating means 52, a primary-side modulating means 53, and a primary-side current control means 54. The primary-side demodulating circuit 7b includes a primary-side demodulating means 55, a primary-side signal amplifying means 56 and a primary-side buffer means 57.

The primary-side modulating circuit 7a and the primary-side signal synthesizing/dividing means 7c are connected to a primary-side transmit-signal input 51, and the primary-side demodulating circuit 7b and the primary-side signal synthesizing/dividing means 7c are connected to a primary-side receive-signal output 58.

A primary-side power supply 59 is power supply acquired via a main-functional-part power output 15.

The primary-side signal synthesizing/dividing means 7c is used when a plurality of signals are to be output from the main functional part 5 or a plurality of signals are to be input to the main functional part 5, that is, when there are a plurality of main-functional-part output signal lines 13 or main-functional-part input signal lines 14.

When there is one main-functional-part output signal line 13, the signal synthesis is not necessary. Thus, the main-functional-part signal output 13 and the primary-side transmit-signal input 51 may be directly connected.

When there is one main-functional-part input signal line 14, signal division is not necessary. Thus, the main-functional-part input signal line 14 may be directly connected to the primary-side receive-signal output 58.

The primary-side signal synthesizing/dividing means 7c may be omitted if not necessary.

A primary-side modulating circuit 7a (including a primary-side carrier-wave generating means 52, a primary-side modulating means 53 and a primary-side current control means 54) is used to transmit a communication signal from the first electronic circuit substrate 2 to the second electronic circuit substrate 4.

A primary-side demodulating circuit 7b (including a primary-side demodulating means 55, a primary-side signal amplifying means 56 and a primary-side buffer means 57) is used to receive a communication signal from the second electronic circuit substrate 4 by the first electronic circuit substrate 2.

The secondary-side communication circuit 11 includes a secondary-side modulating circuit 11a, a secondary-side demodulating circuit 11b, a secondary-side signal synthesizing/dividing means 11c, and a secondary-side communication resonant capacitor 60.

The secondary-side communication circuit 11 is connected to a second communication coil 3Cb and an auxiliary functional part 9. The transmit signal output by the auxiliary functional part 9 is input via an auxiliary-function signal output line 17 to the secondary-side communication circuit 11, and the receive signal input to the auxiliary functional part 9 is output via an auxiliary-function signal input line 16.

A secondary-side modulating circuit 11a includes a secondary-side carrier wave generating means 62, a secondary-side modulating means 63 and a secondary-side current control means 64. A secondary-side demodulating circuit 11b includes a secondary-side demodulating means 65, a secondary-side signal amplifying means 66 and a secondary-side buffer means 67.

The secondary-side modulating circuit 11a and the secondary-side signal synthesizing/dividing means 11c are connected to a secondary-side transmit-signal input 61, and the secondary-side demodulating circuit 11b and the secondary-side signal synthesizing/dividing means 11c are connected to a secondary-side receive-signal output 68.

A secondary-side power supply 69 is power supply acquired via an auxiliary-functional-part power supply input 18.

The secondary-side signal synthesizing/dividing means 11c is used when a plurality of signals are to be output from the auxiliary functional part 9 or a plurality of signals are to be input to the auxiliary functional part 9, that is, when there are a plurality of auxiliary-functional-part output signal lines 17 or auxiliary-functional-part input signal lines 16.

When there is one auxiliary-functional-part output signal line 17, signal synthesis is not necessary. Thus, the auxiliary-functional-part signal output 17 and the secondary-side transmit-signal input may be directly connected.

When there is one auxiliary-functional-part input signal line 16, signal division is not necessary. Thus, the auxiliary-functional-part input signal line 16 may be directly connected to the secondary-side receive-signal output 68.

The secondary-side signal synthesizing/dividing means 11c may be omitted if not necessary.

A secondary-side modulating circuit 11a (including a secondary-side carrier wave generating means 62, a secondary-side modulating means 63 and a secondary-side current control means 64) is used to transmit a communication signal from the second electronic circuit substrate 4 to the first electronic circuit substrate 2.

A secondary-side demodulating circuit 11b (including a secondary-side demodulating means 65, a secondary-side signal amplifying means 66 and a secondary-side buffer means 67) is used to receive a communication signal from the first electronic circuit substrate 2 by the second electronic circuit substrate 4.

Next, the functions of the components in FIG. 15 will be described.

FIG. 15 illustrates a configuration example in which the primary-side communication circuit 7 and the secondary-side communication circuit 11 are symmetrical. The modulation scheme to be used is ASK (Amplitude Shift Keying) scheme.

The primary-side carrier-wave generating means 52 generates a carrier wave to be used for communication. The carrier wave to be used may be a sine wave, a ramp wave, a square wave or the like.

The primary-side modulating means 53 uses the carrier wave acquired from the primary carrier-wave generating means 52, and the transmit signal acquired from the primary-side transmit-signal input 51 to generate a communication signal to be used for communication by electromagnetic induction. The primary-side modulating means 53 is configured by an AND circuit in the example illustrated in FIG. 15.

The primary-side demodulating means 55 demodulates a receive signal from the current acquired in the first communication coil 3Ca. Since the modulation scheme is ASK scheme in the example illustrated in FIG. 15, a rectifier circuit including a capacitor and a diode removes the modulated component.

The primary-side signal amplifying means 56 amplifies the demodulated signal. The primary-side signal amplifying means 56 is an amplifier circuit having an operational amplifier in the example illustrated in FIG. 15.

The primary-side buffer means 57 stabilizes the received communication signal as a digital signal.

Since the functions of the secondary-side carrier wave generating means 62, secondary-side modulating means 63, secondary-side current control means 64, secondary-side demodulating means 65, secondary-side signal amplifying means 66 and secondary-side buffer means 67 in the second electronic circuit substrate 4 are similar to those of the primary-side carrier-wave generating means 52, primary-side modulating means 53, primary-side current control means 54, primary-side demodulating means 55, primary-side signal amplifying means 56 and primary-side buffer means 57, respectively, the description will be omitted.

While FIG. 15 illustrates the example in which the modulation scheme is ASK scheme, PSK (Phase Shift Keying) scheme, FSK (Frequency Shift Keying) scheme, QAM (Quadrature Amplitude Modulation) scheme or the like if used may be easily supported by changing the primary-side carrier-wave generating means 52 (secondary-side carrier wave generating means 62), primary-side modulating means 53 (secondary-side modulating means 63) and primary-side demodulating means 54 (secondary-side demodulating means 64) in accordance with the scheme.

Figure 16:
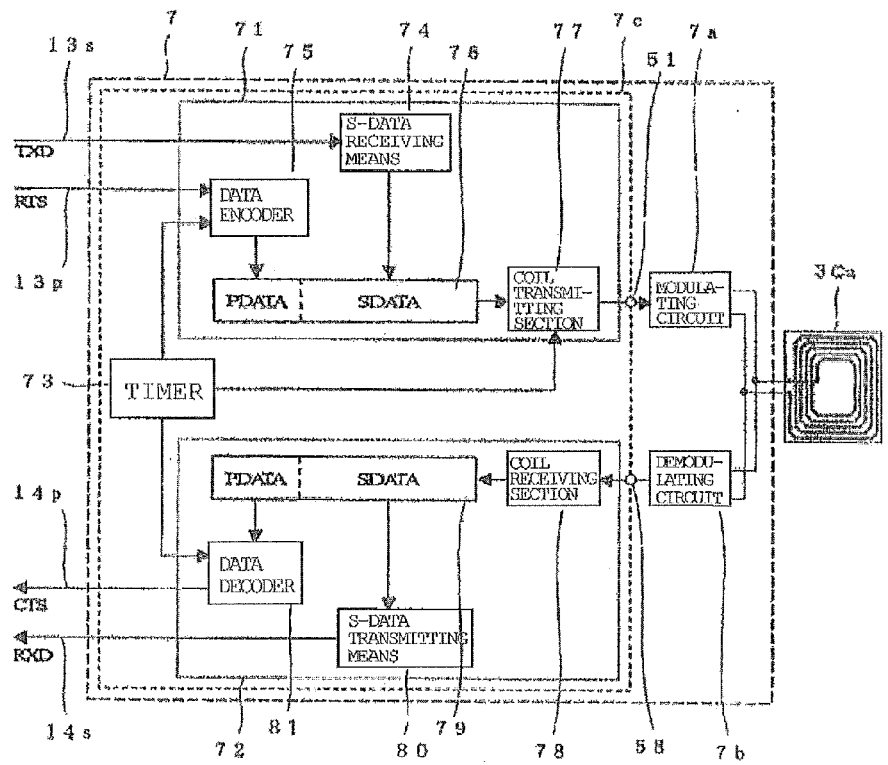
FIG. 16 illustrates a configuration example of the primary-side signal synthesizing/dividing means 7c.

FIG. 16 illustrates a configuration example of the primary-side signal synthesizing/dividing means 7c. Since similar fundamental operations are performed by the primary-side signal synthesizing/dividing means 7c and secondary-side signal synthesizing/dividing means 11c, the primary-side signal synthesizing/dividing means 7c will be mainly described below.

Since the primary-side modulating circuit 7a and primary-side demodulating circuit 7b internally provided in the primary-side communication circuit 7 in FIG. 16 are similar to those described with reference to FIG. 15, the description will be omitted.

In FIG. 16, as described with reference to FIG. 1 or FIG. 5, the main-functional-part output signal line 13 is replaced by a main-functional-part serial output signal line 13s and a main-functional-part parallel output signal line 13p. Similarly, the main-functional-part input signal line 14 is replaced by a main-functional-part serial input signal line 14s and a main-functional-part parallel input signal line 14p.

The signal to be used in the main-functional-part serial output signal line 13s is a serial output signal to be used by the main functional part 5 for performing serial communication with the auxiliary functional part 9. The signal to be used in the main-functional-part serial input signal line 14s is a serial input signal to be used by the main functional part 5 for performing serial communication with the auxiliary functional part 9.

The signal to be used in the main-functional-part parallel signal output line 13p is an RTS (Request to Send) signal to be used for hardware flow control in serial communication. The signal to be used in the main-functional-part parallel signal input line 14p is a CTS (Clear to Send) signal. The RTS and CTS signals are both 1-bit signals.

The main components of the primary-side signal synthesizing/dividing means 7c include a data synthesizing section 71 that synthesizes a plurality of data, a data dividing section 72 that divides into a plurality of data, and a timer 73 that performs time management.

First of all, each component of the data synthesizing section 71 will be described.

The main-functional-part serial output signal line 13s is connected to serial data receiving means 74. The serial data receiving means 74 samples serial data transmitted from the main functional part 5 at predetermined cycles to receive serial data.

The serial data receiving means 74 is connected to a coil transmit-data buffer 76. The serial data receiving means 74 stores the received serial data to a predetermined region in the coil transmit-data buffer 76.

The main-functional-part parallel output signal line 13p is connected to a data encoder section 75. The data encoder section 75 reads the data input from the main-functional-part parallel output signal line 13p.

The data encoder section 75 is connected to a coil transmit-data buffer 76 and reads the data input from the main-functional-part parallel output signal line 13p and stores the read data to a predetermined region in the coil transmit-data buffer 76.

In this case, the data encoder section 75 may simply convert the data input from the main-functional-part parallel output signal line 13p from parallel data to serial data. The data encoder section 75 may further perform data conversion processing such as data compression and redundancy addition and store the converted data to the coil transmit-data buffer 76.

The coil transmit-data buffer 76 is connected to a coil transmitting section 77.

The coil transmitting section 77 outputs the data stored in the coil transmit-data buffer 76 to the modulating circuit 7a connected through the primary-side transmit-signal input 51 at the cycles according to a predetermined transmission speed for performing communication between the primary-side communication circuit 7 and the secondary-side communication circuit 11. The modulating circuit 7a is connected to a first communication coil 3Ca and modulates a signal output from the coil transmitting section 77 and controls the current to be fed to the first communication coil 3Ca.

Next, the components of the data dividing section 72 will be described.

A coil receiving section 78 is connected to a demodulating circuit 7b connected to the first communication coil 3Ca through the primary-side receive-signal output 58. The demodulating circuit 7b demodulates a signal received through the first communication coil 3Ca. The coil receiving section 78 samples the signal as a receive signal from the coil at the cycles according to a predetermined transmission speed for performing communication between the primary-side communication circuit 7 and the secondary-side communication circuit 11. The coil receiving section 78 is connected to the coil receive-data buffer 79 and sequentially stores the sampled data to a coil receive-data buffer 79.

The coil receive-data buffer 79 is connected to serial data transmitting means 80 and a data decoder section 81.

The serial data transmitting means 80 is connected to a main-functional-part serial input line 14s and outputs the data stored in a predetermined region in the coil receive-data buffer 79 to the main-functional-part serial input line 14s at the cycles according to the serial transmission speed of the main functional part 5.

A data decoder section 81 is connected to a main-functional-part parallel input line 14p and outputs the data stored in a predetermined region in the coil receive-data buffer 79, as an input signal to the main functional part 5, to the main-functional-part parallel input line 14p.

In this case, the data decoder section 81 may simply output the data in a predetermined region of the data stored in the coil receive-data buffer 79 to the main-functional-part parallel input signal property 14p. Alternatively, the data decoder section 81 may perform data conversion processing such as data expansion and redundancy deletion on the data in a predetermined region of the data stored in the coil receive-data buffer 79 and output the converted data to the main-functional-part parallel input line 14p.

Next, the timer 73 will be described.

The timer 73 performs time management in the primary-side signal synthesizing/dividing means 7c.

The timer 73 is connected to the data encoder section 75, data decoder section 81, coil transmitting section 77 and coil receiving section 78.

The timer 73 notifies the data encoder section 75 of the timing for reading a signal in the main-functional-part parallel output line 13p, data conversion timing, storage timing to the coil transmit-data buffer 76 and so on.

The timer 73 notifies the data decoder section 81 of reading timing from the coil receive-data buffer 79, data conversion timing, timing for updating the output signal from the main-function parallel input line 14p.

The timer 73 further performs time management for transmission in communication between the primary-side communication circuit 7 and the secondary-side communication circuit 11 on the coil transmitting section 77 and notifies the transmission timing to the coil transmitting section 77.

The timer 73 further performs on the coil receiving section 78 the time management for performing the next processing to the reception in communication between the primary-side communication circuit 7 and the secondary-side communication circuit 11 and receives the timing for a receiving operation event such as the completion of reception, for example, from the coil receiving section 78.

Since the secondary-side communication circuit 11, secondary-side modulating circuit 11a, secondary-side demodulating circuit 11b, secondary-side signal synthesizing/dividing means 11c, auxiliary-functional-part serial output line 17s, auxiliary-functional-part parallel output line 17p, auxiliary-functional-part serial input line 16s, auxiliary-functional-part parallel input line 16p and second communication coil 3Cb are similar to the primary-side communication circuit 7, primary-side modulating circuit 7a, primary-side demodulating circuit 7b, primary-side signal synthesizing/dividing means 7c, main-functional-part serial output line 13s, main-functional-part parallel output line 13p, main-functional-part serial input line 14s, main-functional-part parallel input line 14p and first communication coil 3Ca, the description will be omitted.

Next, with reference to FIGS. 15 and 16, there will be described the communication operations from the main functional part 5 in the first electronic circuit base 2 to the auxiliary functional part 9 in the second electronic circuit substrate 4 by following steps 1 to 12.

Step 1: The main functional part 5 outputs the data to be transmitted to the auxiliary functional part 9 to the main-functional-part serial output line 13s or main-functional-part parallel output line 13p.

Step 2: The serial data receiving means 74 receives the serial data output to the main-functional-part serial output line 13s and stores the received data to a predetermined region in the coil transmit-data buffer 76.

Step 3: The data encoder section 75 reads the parallel data output to the main-functional-part parallel output line 13p on the basis of the reading timing from the timer 73, performs processing such as data conversion and then stores the result to a predetermined region in the coil transmit-data buffer 76.

Step 4: The data output from the main-functional-part serial output line 13s and main-functional-part parallel output line 13p are stored in the coil transmit-data buffer 76 as one data piece.

Step 5: The data stored in the coil transmit-data buffer 76 is transmitted by the coil transmitting section 77 through the primary-side transmit-signal input 51 to the modulating circuit 7a at the cycles according to a predetermined transmission speed for performing communication between the primary-side communication circuit 7 and the secondary-side communication circuit 11.

Step 6: The modulating circuit 7a outputs a communication signal expressed by 1/0 or High/Low from the primary-side transmit-signal input 51 to the primary-side noncontact feeding/communication section 6.

Step 7: The primary-side modulating means 53 ANDs the carrier waves acquired from the primary-side carrier-wave generating means 52 and generates the modulated signal.

Step 8: The modulated signal causes a transistor in the primary-side current control means 54 to perform ON/OFF operation. Thus, the current to be fed from the primary-side power supply 59 to the first communication coil 3Ca is controlled.

Step 9: The current fed to the first communication coil 3Ca causes electromagnetic induction that induces power to the second communication coil 3Cb.

Step 10: From the power induced to the second communication coil 3Cb, the secondary-side demodulating means 65 removes the carrier-wave component, and the communication signal is demodulated.

Step 11: The demodulated communication signal is amplified by the secondary-side signal amplifying circuit 66 to the voltage level receivable by the auxiliary functional part 9 and is stabilized by the secondary-side buffer means 67.

Step 12: The stabilized signal is output by the secondary-side receive-signal output 68 and is captured by the auxiliary functional part 9.

Since the operation for communication from the auxiliary functional part 9 in the second electronic circuit substrate 4 to the main functional part 5 in the first electronic circuit substrate 2 are fundamentally similar to the communication operation from the main functional part 5 in the first electronic circuit substrate 2 to the auxiliary functional part 9 in second electronic circuit substrate 4 for reasons including that the circuits are symmetrical, the description will be omitted.

Having described that the output signals from the main functional part 5 to the auxiliary functional part 9 are a serial signal to be output to main-functional-part serial output line 13s and a parallel signal to be output to main-functional-part parallel output line 13p, a plurality of serial signals and parallel signals may be used.

In that case, in accordance with the numbers of the serial signals and parallel signals, the numbers of the serial receive means 74 and data encoder section 75 may be increased.

Having described the signals to be used herein are digital signals such as a serial signal and a parallel signal, analog signals may be used by using an analog/digital converter (or A/D converter) instead of the serial receive means 74 and the data encoder section 75.

Instead of communication between the main functional part 5 and the auxiliary functional part 9, information exchange may be performed between the primary-side noncontact feeding/communication section 6 and the secondary-side noncontact feeding/communication section 10. In that case, a data region for performing information exchange between the primary-side noncontact feeding/communication section 6 and the secondary-side noncontact feeding/communication section 10 may be provided in the coil transmit-data buffer 76 and coil receive-data buffer 78.

In this way, when the types and the number of signals to be used for communication between the main functional part 5 and the auxiliary functional part 9, the transmission speed between the primary-side communication circuit 7 and the secondary-side communication circuit 9 may be made higher than the transmission speeds between the main functional part 5 and the primary-side communication circuit 7 and between the auxiliary functional part 9 and the secondary-side communication circuit 11.

For example, when the transmission speeds between the main functional part 5 and the primary-side communication circuit 7 and between the auxiliary functional part 9 and the secondary-side communication circuit 11 is 9600 bps, the influence of the overhead relating to the processing in the primary-side communication circuit 7 and the secondary-side communication circuit 11 can be lower if the transmission speed between the primary-side communication circuit 7 and the secondary-side communication circuit 9 is 25 times as fast as 240 kbps.

On the other hand, when the type of signal to be used for communication between the main functional part 5 and the auxiliary functional part 9 is a serial signal only, it can eliminate the necessity for the processing of synthesis and division on the signal in the primary-side signal synthesizing/dividing means 7c or secondary-side signal synthesizing/dividing means 11c.

Thus, without performing the synthesis and division processing on a signal in the primary-side signal synthesizing/dividing means 7c or secondary-side signal synthesizing/dividing means 11c, the main-functional-part output signal line 13 may be directly connected to the primary signal input section 51, and the auxiliary-functional-part output signal line 17 may be connected to the secondary-side transmit-signal input 61.

Similarly, the main-functional-part input signal line 14 may be connected to the primary-side receive-signal output 58, and the auxiliary-functional-part input line 16 may be connected to the secondary-side receive-signal output 68.

In this case, the transmission speed between the main functional part 5 and the primary-side communication circuit 7 and between the auxiliary functional part 9 and the secondary-side communication circuit 11 may be equal to the transmission speed between the primary-side communication circuit 7 and the secondary-side communication circuit 11.

Having described the example in which the primary-side signal synthesizing/dividing means 7c and secondary-side signal synthesizing/dividing means 11c in the primary-side communication circuit 7 and secondary-side communication circuit 11 are configured by hardware, the primary-side signal synthesizing/dividing means 7c and secondary-side signal synthesizing/dividing means 11c may be configured by software.

Figure 17:
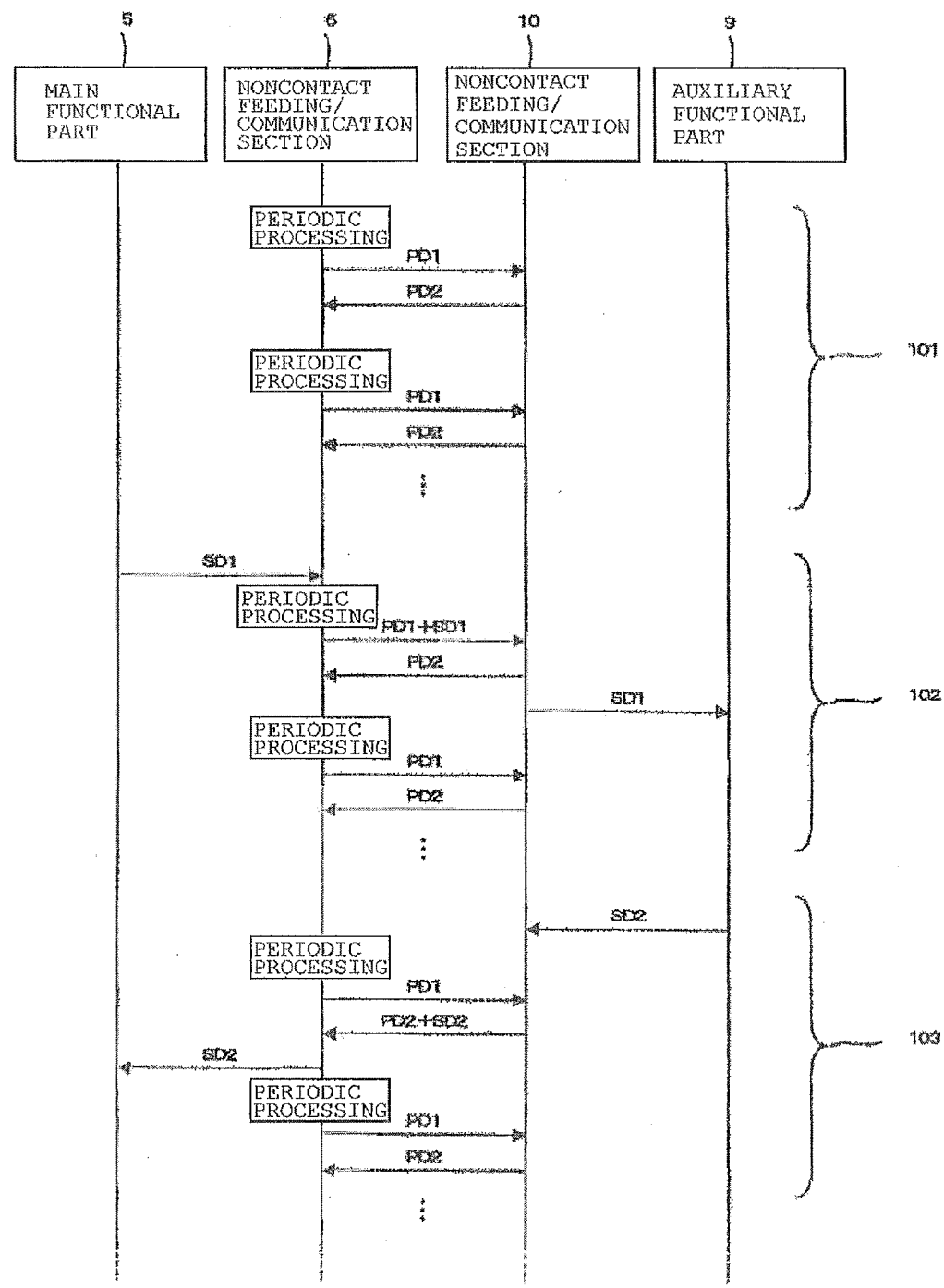
FIG. 17 is a sequence diagram illustrating communication operations between the first electronic circuit substrate 2 and the second electronic circuit substrate 4.

FIG. 17 is a sequence diagram illustrating communication operations between the first electronic circuit substrate 2 and the second electronic circuit substrate 4. In FIG. 17, focusing on the main functional part 5, primary-side noncontact feeding/communication section 6, auxiliary functional part 9 and secondary-side noncontact feeding/communication section 10, descriptions are given to the communication sequence between them.

Referring to FIG. 17, the main functional part 5 and the primary-side noncontact feeding/communication section 6 are connected via a serial communication line and a parallel communication line. Similarly, the auxiliary functional part 9 and the secondary-side noncontact feeding/communication section 10 are connected via a serial communication line and a parallel communication line.

The primary-side noncontact feeding/communication section 6 and the secondary-side noncontact feeding/communication section 10 are connected in a wireless manner, and, as described above, a communication signal is transmitted through the coil 3.

[Normal Communication Sequence 101]

First of all, there will be described a normal sequence, that is, a case where a main-functional-part serial communication signal SD1 is not transmitted from the main functional part 5 to the auxiliary functional part 9 and a main-functional-part, serial communication signal SD2 is not transmitted from the auxiliary functional part 9 to the main functional part 5.

The primary-side noncontact feeding/communication section 6 performs periodic processing at predetermined time intervals. In this case, the primary-side noncontact feeding/communication section 6 transmits a main-functional-part parallel signal PD1 output by the main functional part 5 to the secondary-side noncontact feeding/communication section 10. The operations within the primary-side noncontact feeding/communication section 6 are as described above.

In this case, the secondary-side noncontact feeding/communication section 10 receives the main-functional-part parallel communication signal PD1 output from the main functional part 5 and then, after a lapse of a predetermined period of time, outputs the main-functional-part parallel communication signal PD1 to a parallel input line of the auxiliary functional part 9.

The secondary-side noncontact feeding/communication section 10 transmits the auxiliary-functional-part parallel communication signal PD2 output from the auxiliary functional part 9 to the primary-side noncontact feeding/communication section 6.

In this case, in the secondary-side noncontact feeding/communication section 6, either sequence for the output of the main-functional-part parallel communication signal PD1 to the auxiliary functional part 9 or the sequence for the output or transmission of the auxiliary-functional-part parallel communication signal PD2 may be performed first or they may be performed at the same time. The operations within the secondary-side noncontact feeding/communication section 10 are as described above.

The primary-side noncontact feeding/communication section 6 receives the response containing the auxiliary-functional-part parallel communication signal PD2 from the secondary-side noncontact feeding/communication section 10 and then outputs the auxiliary-functional-part parallel communication signal SD2 to the parallel input signal line of the main functional part 5. Normally, the same processing is repeated at predetermined intervals.

[Main-Functional-Part Transmission Sequence 102]

Next, there will be described a case where the main-functional-part serial communication signal SD1 is transmitted from the main functional part 5 to the auxiliary functional part 9.

The primary-side noncontact feeding/communication section 6 performs periodic processing at predetermined time intervals. However, when the primary-side noncontact feeding/communication section 6 receives the main functional part serial transmit signal SD1 from the main functional part 5 before the periodic processing, the main-functional-part serial transmit signal SD1 is held until the next periodic processing to be performed.

In the periodic processing, the primary-side noncontact feeding/communication section 6 transmits the main-functional-part parallel signal PD1 and main-functional-part serial data SD1 output from the main functional part 5 to the secondary-side noncontact feeding/communication section 10. The operations within the primary-side noncontact feeding/communication section 6 are as described above.

In this case, the secondary-side noncontact feeding/communication section 10 receives the main-functional-part parallel communication signal PD1 and main-functional-part serial communication signal SD1 output from the main functional part 5 and then, after a lapse of a predetermined period of time, outputs the main-functional-part parallel communication signal PD1 to the parallel input line of the auxiliary functional part 9.

The secondary-side noncontact feeding/communication section 10 further outputs the main-functional-part serial communication signal SD1 to the serial input line of the auxiliary functional part 9.

The secondary-side noncontact feeding/communication section 10 transmits the auxiliary-functional-part parallel communication signal PD2 output from the auxiliary functional part 9 to the primary-side noncontact feeding/communication section 6.

In this case, in the secondary-side noncontact feeding/communication section 6, either sequence for output of the main-functional-part parallel communication signal PD1 to the auxiliary functional part 9, sequence for output of the main-functional-part serial communication signal SD1 to the auxiliary functional part 9 or sequence for output or transmission of the auxiliary-functional-part parallel communication signal PD2 may be performed first, or they may be performed at the same time. The operations in the secondary-side noncontact feeding/communication section 10 are as described above.

The primary-side noncontact feeding/communication section 6 receives the response containing the auxiliary-functional-part parallel communication signal PD2 from the secondary-side noncontact feeding/communication section 10 and then outputs the auxiliary-functional-part parallel communication signal SD2 to the parallel input signal line of the main functional part 5.

[Auxiliary-Functional-Part Transmission Sequence 103]

Next, there will be described a case where the auxiliary-functional-part serial communication signal SD2 is transmitted from the auxiliary functional part 9 to the main functional part 5.

The primary-side noncontact feeding/communication section 6 performs periodic processing at predetermined time intervals. However, when the secondary-side noncontact feeding/communication section 10 receives the auxiliary-functional-part serial transmit signal SD2 from the auxiliary functional part 9 before the response of the periodic processing, the main-functional-part serial transmit signal SD2 is held until the response to the next periodic processing.

In the periodic processing, the primary-side noncontact feeding/communication section 6 transmits the main-functional-part parallel signal PD1 output from the main functional part 5 to the secondary-side noncontact feeding/communication section 10. The operations within the primary-side noncontact feeding/communication section 6 are as described above.

In this case, the secondary-side noncontact feeding/communication section 10 receives the main-functional-part parallel communication signal PD1 output from the main functional part 5 and then, after a lapse of predetermined period of time, outputs the main-functional-part parallel communication signal PD1 to the parallel input line of the auxiliary functional part 9.

The secondary-side noncontact feeding/communication section 10 further transmits the auxiliary-functional-part parallel communication signal PD2 output from the auxiliary functional part 9 and the auxiliary-functional-part serial communication signal SD2 received from the auxiliary functional part 9 to the primary-side noncontact feeding/communication section 6.

In this case, in the secondary-side noncontact feeding/communication section 6, either sequence for output of the main-functional-part parallel communication signal PD1 to the auxiliary functional part 9 or the sequence for output or transmission of the auxiliary-functional-part parallel communication signal PD2 may be performed first, or they may be performed at the same time. The operations within the secondary-side noncontact feeding/communication section 10 are as described above.

The primary-side noncontact feeding/communication section 6 receives the response containing the auxiliary-functional-part parallel communication signal PD2 and auxiliary-functional-part serial communication signal SD2 from the secondary-side noncontact feeding/communication section 10 and then outputs the auxiliary-functional-part parallel communication signal PD2 to the parallel input signal line of the main functional part 5 and outputs the auxiliary-functional-part serial communication signal SD2 to the serial input line of the main functional part 5.

Having described the state where the serial communication signal is only transmitted from either main functional part 5 or auxiliary functional part 9, the auxiliary-functional-part serial communication signal SD2 may be transmitted from the auxiliary functional part 9 to the main functional part 5 in the response after the reception of the serial communication signal transmitted from the main functional part 5 to the primary-side noncontact feeding/communication section 6 and secondary-side noncontact feeding/communication section 10.

Having described regarding the periodic processing that the primary-side noncontact feeding/communication section 6 is the master-side apparatus that leads communication and the secondary-side noncontact feeding/communication section 10 is a slave-side apparatus, the secondary-side noncontact feeding/communication section 10 may be the master-side apparatus that leads communication, conversely.

Up to this point, the communication sequences between the first electronic circuit substrate 2 and the second electronic circuit substrate 4 have been described.

Next, there will be described the effects by the configuration of Embodiment 8.

In wireless connection between the first electronic circuit substrate 2 and the second electronic circuit substrate 4, the mutual transmission of a plurality of signals such as serial signals and parallel signals may require means for transmitting the plurality of signals.

In this case, means for increasing the number of circuits and/or coils to be used for communication or means for mutually transmitting a plurality of signals with means for dividing a frequency, for example, may be considered. However, there are problems such as the increase in number of circuits and/or coils and the increase in size of the circuits owing to the frequency multiplexing.

According to Embodiment 8, a plurality of signals are converted to one serial signal by the primary-side signal synthesizing/dividing means 7c, and the serial signal is transmitted between the first communication coil 3Ca and the second communication coil 3Cb. The receiver side demultiplexes the received one serial signal into the original plurality of signals. Thus, the transmission of a plurality of signals can be implemented by one pair of communication circuits (and coils). This can minimize the increase in size of circuit, and the size of the apparatus can be reduced.

According to Embodiment 8, the wired part of a serial communication function under the hardware flow control which has been performed in a wired manner is replaced by the primary-side noncontact feeding/communication section 6, first coil 3a, second coil 3b and secondary-side noncontact feeding/communication section 10. Thus, without changing software such as a communication protocol in the main functional part 5 and auxiliary functional part 9, noncontact power feeding and communication can be implemented.

Embodiment 9

The application examples of the configurations according to Embodiments 1 to 8 may include an indoor remote control for air handling equipment, an outdoor unit control circuit substrate for air handling equipment, an input/output device in a household electrical appliance and an input/output apparatus in FA (or Factory Automation) equipment.

The invention claimed is:

1. Electronic equipment comprising:
a first electronic circuit substrate;
a second electronic circuit substrate;
a first coil connected to said first electronic circuit substrate; and
a second coil connected to said second electronic circuit substrate,
each of said first coil and said second coil being configured with a plurality of flexible-substrate coils,
wherein power is transmitted from said first coil to said second coil by electromagnetic induction so that said first electronic circuit substrate and said second electronic circuit substrate are electrically connected,
wherein said first coil has:
a first power coil that transmits power from said first electronic circuit substrate to said second electronic circuit substrate; and
a first communication coil that communicates between said first electronic circuit substrate and said second electronic circuit substrate,
wherein said second coil has:
a second power coil that receives power transmitted by said first power coil; and
a second communication coil that communicates with said first communication coil, and
wherein the plurality of flexible-substrate coils of each of said first coil and said second coil are placed one over another in parallel with a plane direction.

2. The electronic equipment of claim 1, wherein said first coil and said second coil are stacked in parallel with the plane direction to be disposed.

3. The electronic equipment of claim 2, wherein:
said first power coil and said second power coil are arranged to face each other in parallel with the plane direction;
said first communication coil and said second communication coil are arranged to face each other in parallel with the plane direction; and
a first set composed of said first power coil and said second power coil and a second set composed of said first communication coil and said second communication coil are stacked in parallel with the plane direction through magnetic substance.

4. The electronic equipment of claim 3, wherein magnetic substance is arranged outside of the coils positioned on the opposite side of the opposite faces of said first set and said second set.

5. The electronic equipment of claim 3, wherein a magnetic shielding material is arranged between said first set and said second set.

6. The electronic equipment of claim 1, wherein:
each number of coil turns of said first power coil and said second power coil is adjusted by serially connecting a plurality of flexible-substrate coils and being stacked in parallel with the plane direction.

7. The electronic equipment of claim 1, wherein:
each current capacity of said first power coil and said second power coil is adjusted by connecting a plurality of flexible-substrate coils in parallel and being stacked in parallel with the plane direction.

8. The electronic equipment of claim 1, wherein
at least one of said first coil and said second coil
is fixed to the opposite face of the face where an electronic circuit of said first electronic circuit substrate or said second electronic circuit substrate is mounted, and
is connected to said electronic circuit after being bent at an end of said first electronic circuit substrate or said second electronic circuit substrate and extended toward the face side where said electronic circuit is mounted.

9. The electronic equipment of claim 1, wherein said first coil and said second coil transmit and receive serial data each other.

10. The electronic equipment of claim 1, wherein the communication signal speed between said first coil and said second coil is made to be faster than the communication signal speed used by electronic parts mounted on said first electronic circuit substrate and said second electronic circuit substrate.

11. The electronic equipment of claim 1, wherein said first coil and said second coil have different winding specifications.

12. The electronic equipment of claim 1, wherein said first electronic circuit substrate and said second electronic circuit substrate are removably connected to each other.

13. Electronic equipment comprising:
a first electronic circuit substrate;
a second electronic circuit substrate;
a first coil connected to said first electronic circuit substrate; and
a second coil connected to said second electronic circuit substrate,
wherein power is transmitted from said first coil to said second coil by electromagnetic induction so that said first electronic circuit substrate and said second electronic circuit substrate are electrically connected,
wherein said first coil has:
a first power coil that transmits power from said first electronic circuit substrate to said second electronic circuit substrate; and
a first communication coil that communicates between said first electronic circuit substrate and said second electronic circuit substrate,
wherein said second coil has:
a second power coil that receives power transmitted by said first power coil; and
a second communication coil that communicates with said first communication coil, and
wherein
each of said first coil and said second coil is configured in a single coil by dividing the single coil into two coils with a center tap, then said first power coil and said first communication coil and said second power coil and said second communication coil are provided.

14. Electronic equipment comprising:
a first electronic circuit substrate;
a second electronic circuit substrate;
a first coil connected to said first electronic circuit substrate;
a second coil connected to said second electronic circuit substrate; and,
data synthesis means for synthesizing data transmitted by said first coil or said second coil with said serial data into a single transmission data,
wherein power is transmitted from said first coil to said second coil by electromagnetic induction so that said first electronic circuit substrate and said second electronic circuit substrate are electrically connected,
wherein said first coil has:
a first power coil that transmits power from said first electronic circuit substrate to said second electronic circuit substrate; and
a first communication coil that communicates between said first electronic circuit substrate and said second electronic circuit substrate,
wherein said second coil has:
a second power coil that receives power transmitted by said first power coil; and
a second communication coil that communicates with said first communication coil
wherein the first coil and the second coil transmit and receive serial data each other, and
wherein said first coil or said second coil transmits said transmission data synthesized by said data synthesis means.

15. The electronic equipment of claim 14, further comprising data dividing means for dividing said transmission data received by said first coil or said second coil into each data before the synthesis by said data synthesis means.

* * * * *